US011420202B1

(12) United States Patent
Zhou et al.

(10) Patent No.: US 11,420,202 B1
(45) Date of Patent: Aug. 23, 2022

(54) SYSTEMS AND METHODS FOR FRACTIONATION AND COLLECTION OF ANALYTES IN A SAMPLE

(71) Applicant: ProteinSimple, San Jose, CA (US)

(72) Inventors: Cheng Zhou, Irvine, CA (US); Hui Xu, Dublin, CA (US); Roland Y. Wang, San Jose, CA (US); David J. Roach, Los Gatos, CA (US); Jessica Dermody, San Jose, CA (US); Tom Weisan Yang, Cupertino, CA (US); Jiaqi Wu, Woodbridge (CA)

(73) Assignee: ProteinSimple, San Jose, CA (US)

( * ) Notice: Subject to any disclaimer, the term of this patent is extended or adjusted under 35 U.S.C. 154(b) by 0 days.

(21) Appl. No.: 17/463,326

(22) Filed: Aug. 31, 2021

(51) Int. Cl.
*B01L 3/00* (2006.01)

(52) U.S. Cl.
CPC ... *B01L 3/502715* (2013.01); *B01L 3/502753* (2013.01); *B01L 2200/04* (2013.01); *B01L 2200/16* (2013.01); *B01L 2300/0645* (2013.01); *B01L 2300/0829* (2013.01); *B01L 2400/0406* (2013.01); *B01L 2400/0421* (2013.01)

(58) Field of Classification Search
CPC ......... B01L 3/502715; B01L 3/502753; B01L 2200/04; B01L 2200/16; B01L 2300/0645; B01L 2300/0829; B01L 2400/0406; B01L 2400/0421
See application file for complete search history.

(56) References Cited

U.S. PATENT DOCUMENTS

| | | | |
|---|---|---|---|
| 6,087,188 A | 7/2000 | Johansen et al. |
| 6,126,870 A | 10/2000 | Akhavan-Tafti |
| 6,165,800 A | 12/2000 | Jiang et al. |
| 6,287,767 B1 | 9/2001 | Bronstein et al. |
| 6,395,503 B1 | 5/2002 | Suzuki et al. |
| 6,689,576 B2 | 2/2004 | Matsuno et al. |
| 10,794,860 B2 | 10/2020 | Roach et al. |

(Continued)

OTHER PUBLICATIONS

Hjerten, S. et al., "Theoretical and experimental study of high-performance electrophoretic mobilization of isoelectrically focused protein zones," Journal of Chromatography, vol. 387 (1987), pp. 127-138.

(Continued)

*Primary Examiner* — Brian J. Sines
(74) *Attorney, Agent, or Firm* — Cooley LLP

(57) ABSTRACT

Embodiments include systems, apparatuses, and methods to efficiently separate analytes in a sample and elute fractions of the separated analytes. In some embodiments, a method includes introducing a sample in a capillary with a first end ionically coupled to a first running buffer and a second end ionically coupled to a second running buffer to form a pH gradient. The method includes applying a voltage between the first running buffer and the second running buffer, to separate a plurality of analytes in the sample. The method includes disposing the second end of the capillary in a collection well including a chemical mobilizer and applying a voltage to elute one or more analytes from the plurality of analytes in the sample, that have been separated, into the collection well. Embodiments include detection methods to monitor separation of analytes, mobilization of analytes, and/or elution of fractions containing analytes.

24 Claims, 18 Drawing Sheets

(56) References Cited

U.S. PATENT DOCUMENTS

2007/0062813 A1    3/2007    Gentalen et al.
2015/0093757 A1*   4/2015    Gavin .................... G01N 33/53
                                                                           435/7.1

OTHER PUBLICATIONS

Kristl, T. et al., "Principles and Applications of Capillary Isoelectric Focusing," Primer, Agilent Technologies, Inc. (2014), 48 pages.
Manabe, T. et al., "Effects of catholytes on the mobilization of proteins after capillary isoelectric focusing," Electrophoresis, vol. 18 (1997), pp. 92-97.
Rodriguez-Diaz, R. et al., "Capillary isoelectric focusing," Electrophoresis, vol. 18, Issue 12-13 (1997). pp. 2134-2144.
Rodriguez-Diaz, R. et al., "Capillary Isoelectric Focusing," Chapter 4 In: Handbook of Capillary Electrophoresis (2nd Edition), Landers, James P. (ed.), CRC Press LLC, 1997, pp. 101-138.
Tentori, A. M. et al., "Performance implications of chemical mobilization after microchannel IEF," Electrophoresis, vol. 35 (1997), pp. 1453-1460.

\* cited by examiner

800

```
┌─────────────────────────────────────────────────────────────────┐
│ Introduce, at a first time, a sample containing a plurality of  │
│ analytes in a conductive medium into a capillary, ionically     │
│ coupling a first end of the capillary to a first running buffer │
│ having a first pH.                                              │
│                              871                                │
└─────────────────────────────────────────────────────────────────┘
                                │
┌─────────────────────────────────────────────────────────────────┐
│ Ionically couple a second end of the capillary to a second      │
│ running buffer having a second pH, such that a pH gradient      │
│ forms along the capillary  872                                  │
└─────────────────────────────────────────────────────────────────┘
                                │
┌─────────────────────────────────────────────────────────────────┐
│ Separate, at a second time after the first time, at least a     │
│ subset of the plurality analytes according to their isoelectric │
│ points by applying a voltage across the first running buffer    │
│ and the second running buffer when the first end of the         │
│ capillary is ionically coupled to the first running buffer and  │
│ the second end of the capillary is ionically coupled to the     │
│ second running buffer  873                                      │
└─────────────────────────────────────────────────────────────────┘
                                │
┌─────────────────────────────────────────────────────────────────┐
│ Place the second end of the capillary into a well including a   │
│ chemical mobilizer at a third time after the first time to elute│
│ an analyte from the plurality of analytes from the capillary    │
│ and into the well  874                                          │
└─────────────────────────────────────────────────────────────────┘
                                │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Apply a second voltage across the first running buffer and the │
│ chemical mobilizer at the third time and when the first end of │
│ the capillary is ionically coupled to the first running buffer │
│ and the second end of the capillary is disposed in the well,   │
│ the second voltage and the chemical mobilizer collectively     │
│ causing the analyte to be eluted  875                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Increase, at a fourth time after the third time, a pressure at │
│ the first end of the capillary such that the pressure induces  │
│ hydrodynamic flow in the capillary, eluting the analyte  876   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

SYSTEMS AND METHODS FOR FRACTIONATION AND COLLECTION OF ANALYTES IN A SAMPLE

BACKGROUND

The embodiments described herein relate generally to systems and methods for separating, analyzing, and eluting fractions from sample mixtures. Some embodiments described herein relate to separation and/or fractionation of an analyte or analytes present in a sample based on a property. More particularly, the embodiments described herein generally relate to systems and methods configured to perform capillary-based fractionation using electrophoretic methods of separation followed by elution.

SUMMARY

Systems and methods for capillary electrophoresis, analyte visualization and fraction collection are described herein. In one aspect, a method includes introducing, at a first time, a sample containing a plurality of analytes in a conductive medium into a capillary. The method includes ionically coupling a first end of the capillary to a first running buffer having a first pH, and ionically coupling a second end of the capillary to a second running buffer having a second pH, such that a pH gradient forms along the capillary. The method further includes separating, at a second time after the first time, at least a subset of the plurality analytes according to their isoelectric points by applying a voltage across the first running buffer and the second running buffer when the first end of the capillary is ionically coupled to the first running buffer and the second end of the capillary is ionically coupled to the second running buffer. The method further includes detecting an analyte from the plurality of analytes separated along the pH gradient. The method further includes identifying a peak of a distribution associated with an amount of separated analyte along the pH gradient. The method further includes placing the second end of the capillary into a well including a chemical mobilizer at a third time after the first time to mobilize and selectively elute an analyte from the plurality of analytes from the capillary and into the well, based on the identifying the peak of the distribution associated with an amount of separated analyte. The method optionally includes monitoring a migration of the peak of distribution associated with the amount of separated analyte during elution to collect an individual fraction of the separated analyte

BRIEF DESCRIPTION OF THE DRAWINGS

FIG. 8 is a flowchart of a method of using a fractionation system, according to one implementation.

DETAILED DESCRIPTION

Figure 1:
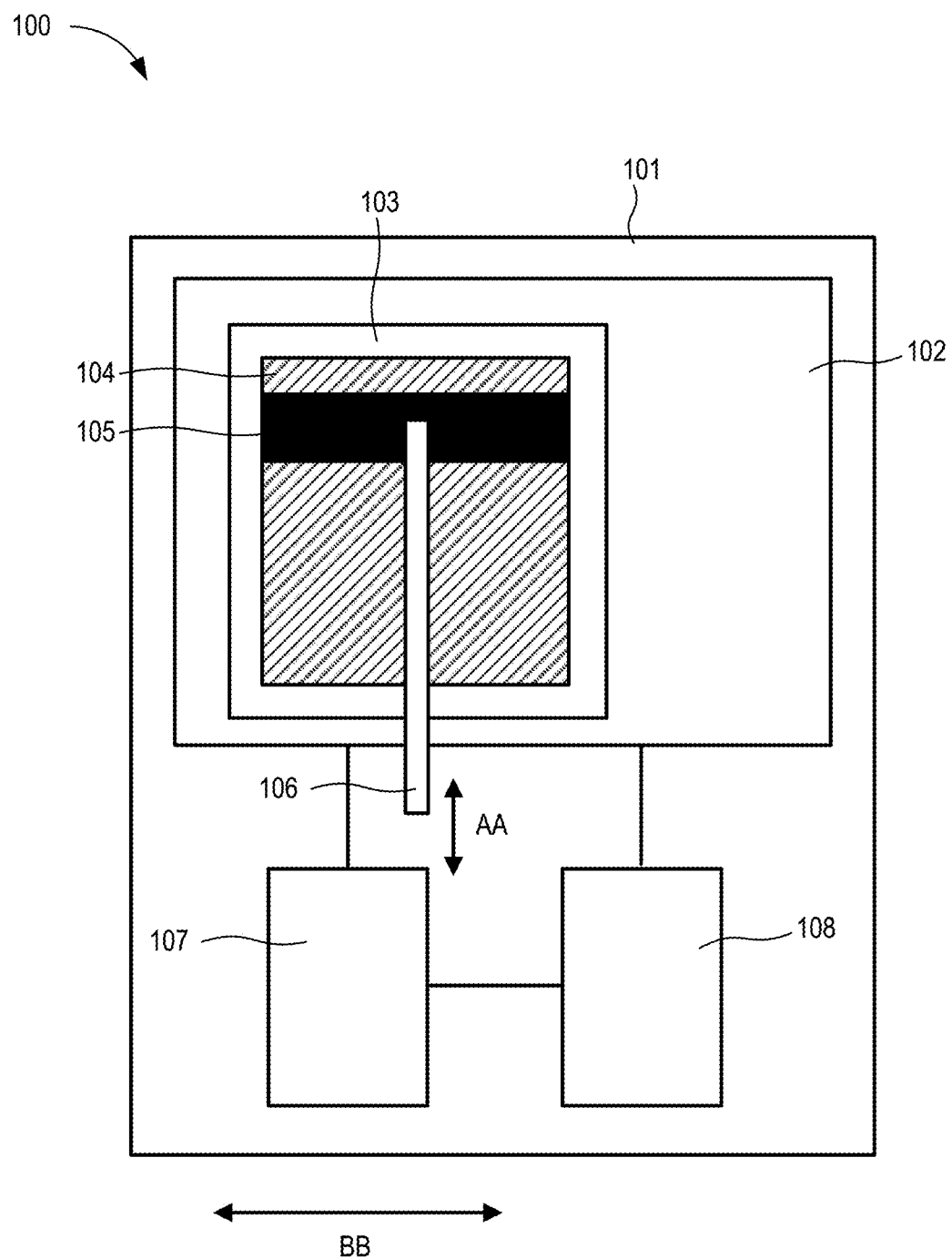
FIG. 1 is a schematic illustration of a fractionation system, a system configured to perform capillary electrophoresis and/or fractionate analytes separated by capillary electrophoresis, according to an embodiment.

In some embodiments, a method includes introducing, at a first time, a sample containing a plurality of analytes in a conductive medium into a capillary. The method includes ionically coupling a first end of the capillary to a first running buffer having a first pH, and ionically coupling a second end of the capillary to a second running buffer having a second pH, such that a pH gradient forms along the capillary. The method further includes separating, at a second time after the first time, at least a subset of the plurality analytes according to their isoelectric points by applying a voltage across the first running buffer and the second running buffer when the first end of the capillary is ionically coupled to the first running buffer and the second end of the capillary is ionically coupled to the second running buffer. The method further includes placing the second end of the capillary into a well including a chemical mobilizer at a third time after the first time to selectively elute an analyte from the plurality of analytes from the capillary and into the well.

In some embodiments, a method includes introducing, at a first time, a sample in a conductive medium into a capillary, a first end of the capillary being ionically coupled to a first running buffer having a first pH, a second end of the capillary being ionically coupled to a second running buffer having a second pH such that a pH gradient is formed along the capillary. The method further includes separating, at a second time after the first time, a plurality of analytes from the sample by applying a voltage between the first running buffer and the second running buffer. The method further includes moving, at a third time after the second time, the second end of the capillary from a reservoir containing the second running buffer to a collection well, and increasing, at a fourth time after the third time, a pressure at the first end of the capillary to elute a portion of the sample containing a first analyte from the plurality of analytes that has a first isoelectric point and not a second analyte from the plurality of analytes that has a second isoelectric point different from the first isoelectric point.

In some embodiments, an apparatus includes a capillary configured to electrophoretically focus an analyte contained within a sample, a running buffer reservoir configured to contain a first running buffer having a first pH in ionic communication with a first end of the capillary, and a sample plate defining a plurality of wells. The sample plate and the capillary are collectively configured such that a second end of the capillary can move between each well from the plurality of wells. The apparatus includes a first well from the plurality of wells that is configured to contain the sample, and the capillary and the sample plate are collectively configured such that, when a second end of the capillary is disposed in the first well, a portion of the sample can be drawn into the capillary. The apparatus includes a second well from the plurality of wells that is configured to contain a second running buffer having a second pH different from the first pH such that when the second end of the capillary is disposed in the second well, the buffer reservoir containing the first running buffer and the second well containing the second running buffer are in ionic communication. The apparatus further includes an electrical power source configured to apply a voltage across the running buffer reservoir and the second running buffer such that, when the second end of the capillary is disposed in the second well and the voltage is applied, a pH gradient is established across the capillary and the analyte migrates to a portion of the capillary associated with its isoelectric point. The apparatus includes a third well from the plurality of wells that is configured to contain a chemical mobilizer.

A chemical mobilizer can be a buffered solution configured to supply ions to the capillary, typically after a steady state pH gradient has been established and analytes have been focused into stationary positions in the capillary and the pH gradient corresponding to their isoelectric points. The chemical mobilizer disrupts the (typically steady state) pH gradient and in doing so imparts a charge on the analyte causing it to migrate. Such analytes can migrate into collection wells containing the chemical mobilizer. Chemical mobilizers generally are operable to cause the separated analytes to migrate and/or be eluted. In some implementations, multiple collection wells containing a chemical mobilizer can be used to successively move the distal end of the capillary to be disposed in each successive collection well such that separated analytes can be eluted in the order in which they are focused. In some implementations, a chemical mobilizer can be used to completely elute all separated analytes into a set of collection wells or vials. In some implementations, a chemical mobilizer can be used to partially elute a portion of the separated analytes into a set of collection wells or vials.

Techniques such as Isoelectric focusing (IEF) can be a powerful approach to separating analytes in a sample, for example, charge variants of protein molecules such as monoclonal antibody (mAb) or other biological molecules, with good resolution and sensitivity. Therapeutic monoclonal antibodies (mAbs) make up a large portion of the rapidly growing drug market. Ensuring safety and efficacy through comprehensive understanding of these products' critical quality attributes (CQAs), including charge heterogeneity, is a regulatory requirement. Various charge isoforms of mAbs can result from cell culture or production processes, potentially affecting the mAb structure and function. Imaged capillary isoelectric focusing (icIEF) is a method that can be used for charge profiling. Ion-exchange chromatography (IEC) has also been a major tool for fractionation combined with characterization. IEC, however, is not compatible with certain types of molecules, hydrophobic antibody drug conjugates (ADCs) for example, and icIEF typically provides higher separation resolution. Moreover, an individual charge variant obtained from IEC fractionation may not be comparable to the variant peak in the icIEF profile. Therefore, there is an unmet need for IEF-based fractionation of charge variants for characterization.

IEF can be performed with the sample mixed with ampholytes sandwiched between an acid and a base reservoir. Under an electric field, each charged component of the sample migrates to a position along a pH gradient formed by the ampholytes where the pH is the same as that component's isoelectric point (pI). Capillary isoelectric focusing (CIEF) is a variant of this approach where IEF is performed in a sample held in a lumen of a capillary.

In case of CIEF, due to the miniatured fluidic path and insignificant Joule heating involved, larger magnitude electric fields can be applied for the separation of components in a sample held in the lumen of a capillary, resulting in fast separation and better resolution of separation of the analytes in the sample. Whole column imaging capillary isoelectric focusing (iCIEF) is a method that can used as described in U.S. Pat. No. 10,794,860 entitled, "Systems and methods for capillary electrophoresis, isoelectric point, and molecular weight analysis," filed on Jul. 12, 2018, the disclosure of which is incorporated herein by reference in its entirety. iCIEF further improves the speed, resolution, and precision of the assay due to the fact that no sample mobilization is needed for the detection and a shorter capillary can be used for the separation. Because of its superior performance, iCIEF can be widely used as a standardized analytic tool in several industries including pharmaceutical industry for characterization and quality control of therapeutic proteins including mAb, antibody drug conjugate (ADC) and other biological molecules.

While iCIEF is a powerful method yielding rich information about charge variants of proteins, sometimes additional information may be desired to fully characterize and identify a molecule, for example, to identify and/or isolate unknown impurities that may arise from formulation or bioprocessing stages of generating the molecule. It may be desirable to not only separate the charge variants but also to isolate them for further analysis using the methods such as Mass Spectrometry (MS) or other biological assays.

Methods explored to utilize additional processing in conjunction with separation techniques like iCIEF can be categorized into two groups: fraction collection and hyphenated cIEF-MS. Fraction collection methods allow individual fractions of charge variants in a sample to be collected and further processed according to desired needs. Hyphenated cIEF-MS methods interface directly from the capillary of the cIEF system into the ionization source of a MS system. While the hyphenated cIEF-MS method circumvents the efforts needed for fraction collection, it has some limitations: (1) the fractions cannot be analyzed by downstream analysis method other than MS; (2) performance of the MS will be compromised if the cIEF run needs UREA or any other additives that are unfriendly to MS systems; (3) peptide mapping is not possible on such hyphenated platform. On the other hand, multiple fraction collection devices have been developed and commercialized but with limited success either because of the poor performance (e.g., poor resolution, insufficient sensitivity, low yield, etc.) or because they are difficult to operate (e.g., complicated device set up, lack of robustness, etc.). Embodiments disclosed herein provide a novel icIEF fractionation solution, which involves icIEF separation and collection of charge variants. Some embodiments described enable Maurice™ icIEF-based peak identification followed by downstream characterization, such as native analysis of collected charge variants using ZipChip (CE-ESI) due to the broad sample matrix compatibility, easy sample prep, and fast mass spectrometry analysis time.

Embodiments described herein include apparatus, methods, and systems for performing fractionation of analytes in a sample using a suitable separation technique (e.g., capillary isoelectric focusing) such that there is streamlined, semi-automatic, separation, visualization, detection, and/or fractionation of analytes in a sample into fraction collection wells. The fractionation can be such that the collected analytes can be further processed using any suitable technique without any restriction as in the case of the hyphenated cIEF-MS methods.

Definitions

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" mean plus or minus 10% of the value stated and all values in between. For example, about 0.5 would include 0.45 and 0.55, about 10 would include 9 to 11, about 1000 would include 900 to 1100. The term "substantially" when used in connection with shape relationships (e.g., linear, cylindrical, etc.), structural relationships (e.g., perpendicular, etc.), and/or other geometric relationships is intended to convey that the structure so defined is nominally linear, cylindrical, perpendicular, and/or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the terms "perpendicular" and/or "normal" generally describe a relationship between two geometric constructions (e.g., two lines, two planes, a line and a plane, or the like) in which the two geometric constructions are disposed at substantially 90°. For example, a line is said to be "perpendicular" to another line when the lines intersect at an angle substantially equal to 90°. Similarly, when a planar surface (e.g., a two-dimensional surface) is said to be "normal" to another planar surface, the planar surfaces are disposed at substantially 90° (e.g., substantially orthogonal) as the planar surfaces extend to infinity.

As used herein the term "module" refers to any assembly and/or set of operatively-coupled electrical components that can include, for example, a memory, a processor, electrical traces, optical connectors, software (executed in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the terms "analyte" and/or "target analyte" refer to any molecule or compound to be separated and/or detected with the methods, apparatus and systems provided herein. Suitable analytes include, but are not limited to, small chemical molecules such as, for example, environmental molecules, clinical molecules, chemicals, pollutants, and/or biomolecules. More specifically, such chemical molecules can include, but are not limited to pesticides, insecticides, toxins, therapeutic and/or abused drugs, antibiotics, organic materials, hormones, antibodies, antibody fragments, antibody-molecule conjugates (e.g., antibody-drug conjugates), antigens, cellular membrane antigen, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides (comprising ribonucleic acid and/or deoxyribonucleic acid), transition state analogs, inhibitors, receptors, receptor ligands (e.g., neural receptors or their ligands, hormonal receptors or their ligands, nutrient receptors or their ligands, and/or cell surface receptors or their ligands), receptor-ligand complexes, nutrients, electrolytes, growth factors and other biomolecules and/or non-biomolecules, as well as fragments and combinations thereof. In some embodiments, the analyte is a protein or a protein complex, and the sample is a cellular lysate or a purified protein. Other suitable analytes can include aggregates, agglomerates, floc, and/or dispersed phase droplets or particles of colloids and/or emulsions.

As used herein, the term "sample" refers to a composition that contains an analyte or analytes to be detected. A sample, in some embodiments, is heterogeneous, containing a variety of components (e.g., different proteins) or homogenous, containing one component (e.g., a population of one protein). In some instances, a sample can be naturally occurring, a biological material, and/or a manufactured material. Furthermore, a sample can be in a native (e.g., a cell suspension) or denatured form (e.g., a lysate). In some instances, a sample can be a single cell (or contents of a single cell, e.g., as a cellular lysate from the single cell, or a purified protein) or multiple cells (or contents of multiple cells, e.g., as a cellular lysate from the multiple cells, or a purified protein from the multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus.

In some embodiments, the sample is a heterogeneous biological sample or derived from a heterogeneous biological sample, for example a tissue lysate, a cellular lysate or a mixture of biomolecules such as proteins (e.g., a purified protein). In a further embodiment, a protein within the cellular lysate is the analyte to be detected by the methods and systems described herein. In a further embodiment, the apparatus, systems, and methods provided herein provide for the detection of a particular form of a protein, for example, a phosphorylated protein. The cellular lysate, for example, can be the lysate of one cell or a mixture of cells. Moreover, the cellular lysate can include a single cell type, or multiple cell types. The cell type, in some embodiments, includes a stem cell or a cancer cell, or a population of stem cells, or a population of cancer cells. In some embodiments, a sample comprises one or more stem cells (e.g., any cell that has the ability to divide for indefinite time periods and to give rise to specialized cells) and/or stem cell lysates. Suitable examples of stem cells can include but are not limited to embryonic stem cells (e.g., human embryonic stem cells (hES)), and non-embryonic stems cells (e.g., mesenchymal, hematopoietic, induced pluripotent stem cells (iPS cells), or adult stem cells (MSC)).

In some instances, prior to detecting and/or fractionating an analyte in a sample with the apparatus and systems provided herein, processing may be performed on the sample. For example, a sample can be subjected to a lysing step, denaturation step, heating step, purification step (e.g., protein purification), precipitation step, immunoprecipitation step, column chromatography step, centrifugation, etc. In some embodiments, a sample is subjected to a denaturation step prior detecting and/or separating a target analyte in a sample with the methods, apparatus, and systems described herein. The processing step on the sample, in some embodiments, is performed in one of the apparatus or systems described herein. In another embodiment, the processing step is performed prior to introducing the sample into one of the apparatus or systems set forth herein.

As used herein, the terms "standard" and/or "internal standard" refer to a well-characterized substance of known amount and/or identity (e.g., known isoelectric point, molecular weight, electrophoretic mobility profile, number of base pairs in the case of a nucleic acid, molecular composition, etc.) that can be added to a sample comprising the analyte, for comparative purposes. In some embodiments, a known quantity of standard is added to a sample comprising one or more analytes, and both the standard and the molecules in the sample, including the analyte(s) are separated on the basis of isoelectric point by electrophoresis). A comparison of the standard and analyte signal then provides a quantitative or semi-quantitative measure of the amount of analyte originally present in the sample.

In general, isoelectric focusing (IEF) standards are known based on established isoelectric point. Similarly, molecular weight standards are known. In some instances, the standard and/or the analyte(s) can be detected with one or more detection molecules or reagents, such as with an antibody against the analyte or a labeling moiety attached to the standard. In some embodiments, a primary antibody is used to bind the target analyte, and a secondary antibody conjugated to a fluorescent or a chemiluminescent reagent is introduced to bind the primary antibody or the primary antibody-analyte complex. The signal of the fluorescent or chemiluminescent molecule is then detected. In other instances, the standard and/or the analyte(s) can be detected via native fluorescence (e.g., via fluorescence of tryptophan amino acids within the standard and/or analyte(s)) and/or absorbance. The signal of the standard and the signal of the analyte(s) can then be compared to measure the concentration of the analyte(s) in the sample. In addition, or alternatively, a relevant characteristic of the analyte (e.g., isoelectric point, molecular weight, etc.) can be determined by comparison to the standard.

In some embodiments, an internal standard can be a purified form of the analyte itself, which is generally made distinguishable from the analyte in some way. Any method of obtaining a purified form of the analyte can include but is not limited to purification from nature, purification from organisms grown in the laboratory (e.g., via chemical synthesis), and/or the like. The distinguishing characteristic of an internal standard can be any suitable change that can include but is not limited to dye labeling, radiolabeling, or modifying the mobility of the standard during the electrophoretic separation so that it is distinguishable from the analyte. For example, the analyte and the internal standard can each be labeled with fluorescent dyes that are each detectable at discrete emission wavelengths, thereby allowing the analyte and the standard to be independently detectable. In some instances, an internal standard is different from the analyte but behaves in a way similar to or the same as the analyte, enabling relevant comparative measurements. In some embodiments, a standard that is suitable for use can be any of those described in U.S. Patent Application Publication No. 2007/0062813 entitled, "Electrophoresis Standards, Methods and Kits," filed on Sep. 20, 2006, the disclosure of which is incorporated herein by reference in its entirety. For example, in some embodiments, the multiple analytes are a population of proteins or a subpopulation of proteins. In this regard, it may not be practical to include a single internal standard corresponding to each of the individual proteins of the population of proteins or subpopulation of proteins. Accordingly, in some embodiments, a general isoelectric point standard is introduced into the systems and apparatus provided herein. The standard, in some embodiments, can be a ladder standard operable to identify different isoelectric points along the capillary tube. Proteins in the sample that migrate during the electrophoresis are compared to the ladder to determine the isoelectric point of the proteins present in the sample. In some embodiments, ladder standards are used.

Overview of a Fractionation Process

Embodiments described include systems and methods to perform separation, detection, and/or fractionation of one or more analytes in a sample (e.g., based on molecular weight and/or isoelectric point). The sample can be prepared in a conductive medium and loaded into capillary that is in turn loaded into a fractionation system (also referred to herein as "the system").

The embodiments of fractionation systems described herein can be used to separate analytes, detect and/or visualize separated analytes, and selectively fractionate one or more analytes in a sample, based on the separation and/or visualization, using a single system. Embodiments described herein can use microfluidic separation techniques, thereby enabling the analysis of very small volume samples.

In some instances, multiple analytes can be separated, detected, and/or fractionated from a sample loaded in a single capillary by the system using apparatus and/or methods provided herein. For example, in some instances, a user can load a capillary cartridge into the system and can initiate and/or otherwise provide instructions to the system to cause the system to at least semi-automatically separate analytes (e.g., proteins) within the sample by isoelectric point.

Separation

Analytes and/or standards described above, can be separated using a fractionation system by taking advantage of any suitable mobility parameter such as charge, molecular weight, electrophoretic mobility (e.g., influenced by molecular weight, characteristic length, area, or volume, oligonucleotide length, or other suitable characteristic), and/or the like. The sample can be loaded into a capillary and the capillary can be positioned in the system such that a first end of the capillary is coupled to a first running buffer having a first pH and a second end of the capillary can be ionically coupled to a second running buffer having a second pH, such that a pH gradient is formed along the length of the capillary via the lumen of the capillary. The analytes can be separated (e.g., according to their isoelectric points) by applying a voltage across the first running buffer and the second running buffer For example, in some embodiments a voltage can be applied between the first running buffer having the first pH that is ionically coupled to a first end of the capillary, and a second running buffer having the second pH that is ionically coupled to a second end of the capillary. The applying of the voltage across the ends of the capillary can induce separation of analytes along a fluid path in the capillary lumen comprising the sample, based on a mobility parameter such as an isoelectric point and/or the like.

In some embodiments, the capillary can include a separation matrix, which can be added in an automated fashion. Capillary electrophoresis in a separation matrix using the system can be analogous to separation in a polymeric gel, such as a polyacrylamide gel or an agarose gel, where molecules are separated on the basis of the mobility parameter of the molecules in the sample, by providing a porous passageway of fluid path through which the molecules can travel.

Detection

In some embodiments, once the separation is complete, and the separated analytes can be probed and analyzed to determine an identity of an analyte and/or to determine a degree of separation of analytes. In other words, once the analytes and/or standards are separated, the apparatus and/or systems described herein can continue to provide a flow of electric current and/or a pressure differential (e.g., using a vacuum source) operable to maintain the analytes and/or standards at their respective relative points of separation (e.g., isoelectric points). In some instances, a pressure differential (e.g., negative pressure) can be applied to offset gravitational effects due to a vertical column of liquid which may otherwise create a hydrodynamic flow that may reduce resolution and/or mobilize the pH gradient formed in the capillary. The fractionation system can be initiated to or instructed to probe and analyze the contents of one or more portions of the capillary lumen comprising the separated analytes based on a property (e.g., isoelectric point). The system can probe using suitable detectors via viewing windows that provide access to the capillary lumen. In some instances, the system captures digital or analog images associated with a detection and/or separation of analytes within a sample (e.g., including any suitable agent, reagent, protein, analyte, buffer, lysate, etc.) drawn into a capillary of the capillary cartridge. The system can analyze the images and/or other data associated with the detection and can provide a measure of relative separation of the constituents of the sample. The system can use the measure of relative separation between the analytes and/or constituents to determine a desired rate of migration of the separated constituents of the sample towards a distal end and to elute one or more fractions of the separated analytes.

In some embodiments, the sample can include or be subjected to detection agents that may be bound to the separated analytes and/or standards such that they can be then probed to identify and/or localize each separated analyte and/or standard. A detection agent can be capable of binding to or interacting with the analyte and/or standard to be detected. Detection agents may allow the detection of a standard and an analyte by any means such as but not limited to fluorescent dye(s), optical dye(s), chemiluminescent reagent(s), radioactivity, particles, magnetic particle(s), paramagnetic particle(s), etc. Detection agents can include any organic or inorganic molecules such as, for example, proteins, peptides, antibodies, enzyme substrates, transition state analogs, cofactors, nucleotides, polynucleotides, aptamers, lectins, small molecules, ligands, inhibitors, drugs, and other biomolecules as well as non-biomolecules capable of binding the analyte to be detected. In some embodiments, the detection agents comprise one or more label moieties. Label moieties can be a reactive moiety that includes a functional group that can be converted to a functionality that adheres to an analyte via any suitable interaction including hydrophobic interactions, ionic interactions, hydrogen bonding and/or the like. In some embodiments, such reactive moieties can be activated by light (e.g., UV light), laser mediated excitation, temperature mediated excitation, or any other source of energy in order to label one or more analytes separated and/or localized in the fluid paths in a capillary. In some embodiments, the detection agents can include one or more label moiety(ies). In embodiments employing two or more label moieties, each label moiety can be the same, or some, or all, of the label moieties may differ.

In some embodiments, the label moiety can be and/or can include a chemiluminescent label. Suitable labels moieties can include enzymes capable of reacting with a chemiluminescent substrate in such a way that photon emission by chemiluminescence is induced. For example, enzymes can induce chemiluminescence in other molecules through enzymatic activity. Such enzymes can be and/or can include peroxidase, for example, horseradish peroxidase (HRP), β-galactosidase, phosphatase, etc. In some embodiments, the chemiluminescent label can be selected from any of a variety of classes of luminol label, an isoluminol label, etc. In some embodiments, a detection agent can include chemiluminescent-labeled antibodies, for example, a secondary antibody covalently bound to HRP. In some embodiments, the detection agents comprise chemiluminescent substrates such as, for example, Galacton substrate available from Applied Biosystems of Foster City, Calif. or SuperSignal West Femto Maximum Sensitivity substrate available from Pierce Biotechnology, Inc. of Rockford, Ill., or any other suitable substrates. In some embodiments, a detection agent can be any of those described in U.S. Pat. Nos. 6,689,576, 6,395,503, 6,087,188, 6,287,767, 6,165,800, and 6,126,870, the disclosures of which are incorporated herein by reference in their entireties.

In some embodiments, the label moiety can be and/or can include a bioluminescent compound (e.g., found in biological systems in which a catalytic protein increases the efficiency of the chemiluminescent reaction). The presence of a bioluminescent compound is determined by detecting the presence of luminescence. Suitable bioluminescent compounds include, but are not limited to luciferin, luciferase, and aequorin.

In some embodiments, the label moiety can be and/or can include a fluorescent dye. Such fluorescent dyes can include a resonance-delocalized system or aromatic ring system that absorbs light at a first wavelength and emits fluorescent light at a second wavelength in response to the absorption event. Fluorescent dyes can be any of a variety of classes of fluorescent compounds such as but not limited to xanthenes, rhodamines, fluoresceins, cyanines, phthalocyanines, squaraines, bodipy dyes, coumarins, oxazines, and carbopyronines. In some embodiments, for example, where detection agents contain fluorophores, such as fluorescent dyes, their fluorescence is detected by exciting them with an appropriate light source, and monitoring their fluorescence by a detector sensitive to their characteristic fluorescence emission wavelength.

In some embodiments, the label moiety can be and/or can include a photopigment with a specified optical density that can used to distinguish regions of localization of the analyte bound to the photopigment (e.g., based on one or more peaks in optical density signal from probing the fluid path in a capillary) from regions of separation between analytes (e.g., based on a trough in the optical density signal from detection).

In some embodiments, two or more different agents can be used to bind to or interact with two or more different analytes to enable more than one type of analytes to be detected simultaneously. In some embodiments, two or more different detection agents, which bind to or interact with the one analyte, can be detected simultaneously. In various embodiments, using two or more different detection agents, one agent can bind to or interact with one or more analytes to form a first agent-analyte complex, and a second reagent, the detection agent can be used to bind to or interact with the first agent-analyte complex.

In another embodiment, two or more different detection agents can enable detection of two or more forms of analytes of interest. In some embodiments, a single specific detection agent, for example an antibody, can allow detection and analysis of both phosphorylated and non-phosphorylated forms of an analyte. In some embodiments, multiple detection agents can be used with multiple substrates to provide color multiplexing. For example, different chemiluminescent substrates can be used to emit light of differing wavelengths. Selective detection of different emission wavelengths and/or emitted colors (e.g., via a diffraction grating, a prism(s), a series of colored filters, and/or the like) can allow determination of which color photons or light of what range of wavelengths is being emitted at any position along a fluid path (e.g., along a molecular weight gradient), and therefore determination of which detection agents are present at each emitting location in the capillary lumen. In some embodiments, selective detection of different emission wavelengths associated with different analytes can be used to determine the emitting location of an analyte and follow a path and/or rate of migration of the analyte as the separated analytes and/or standards are guided to migrate towards a distal end of the capillary to be eluted and/or fractionated. In some embodiments, different chemiluminescent reagents can be supplied sequentially, allowing different bound detection agents to be detected sequentially.

Visualization and Elution

In some embodiments, the separated and/or labeled analytes can be visualized and their relative localization along the fluid path can be determined. The apparatus can then be manipulated to elute one or more analytes individually based on the visualization and/or relative localization of the separated analytes. For example, one or more of the separated analytes can be mobilized towards a distal end of the fluid path and eluted out of the fluid path with careful isolation using any suitable driving force (e.g., pressure ejection, delivering varying voltages between a proximal end of the capillary and the distal end of the capillary, chemical mobilizers, etc.). That is, following visualization one or more of the separated analytes can be made to migrate towards a distal end of the capillary, and eluted out of the capillary to be collected in a collection well. The separated analytes can be mobilized towards the distal end of the capillary using any suitable technique including pressure ejection, voltage induced mobilization towards a distal end of the capillary, elution using chemical mobilizers, etc. In some instances, chemicals with different negative ions, for example, acetate and phosphate, can be used as chemical mobilizers.

In some embodiments, the analytes and/or standards that have been separated can be mobilized and/or caused to migrate at a desired rate. A rate of migration and/or a rate mobilization of the separated analytes can be manipulated using any suitable mechanism including applied electric current, applied pressure, etc. In some implementations, the separation of the analytes can be continuously monitored during mobilization and/or elution. Mobilization and/or elution can be accomplished while maintaining at least a minimum or desired degree of relative separation based on their respective isoelectric points (e.g., a minimal separation between peaks or distributions of two adjacent separated analytes may be maintained such that each may be eluted separately or selectively without significant or substantial contamination of the other).

In some implementations, the migration of separated bands of analytes and serial elution of isolated bands of one or more analytes can be conducted while still maintaining separation of the analytes by providing appropriate counterbalancing force to prevent mixing of the separated analytes. For example, a counter balancing force of negative pressure (via vacuum source) can be used to counter the effects of gravity on a vertically oriented capillary during elution of separated analytes.

In some implementations, the visualization and/or detection of analytes can be conducted in a real-time or semi-real-time manner such that the separated analytes and their relative localization (e.g., localization of a peak concentration of each separated analyte in the fluid path) can be monitored as the separated analytes are made to migrate towards the distal end of the capillary. In some implementations, the apparatus can be manipulated such that a movement of a sample plate including a plurality of collection wells can be coordinated based on the relative localization of analytes (e.g., relative location of peak concentrations of each separated analyte) and/or a rate of migration of each analyte (e.g., rate of migration of a peak concentration of each analyte). For example, the sample plate can include multiple collection wells and the capillary can be moved between collection wells eluting a fraction of the sample (e.g., one or more separated analytes) into each collection well. In some embodiments, each collection well can contain a chemical mobilizer (e.g., the same or different chemical mobilizers), and the capillary can be moved from collection well to collection well. While in a collection well a voltage can be applied until a fraction of the sample is eluted. Once the fraction of the sample is eluted (e.g., as determined by continuous monitoring of the capillary), the capillary can be moved to another collection well, where a subsequent fraction of the sample can be eluted. In addition, or as an alternative to chemical mobilization, a fraction of the sample can be eluted into each collection well by applying a pressure to the capillary.

A Fractionation System

FIG. 1 is a schematic illustration of a portion of a fractionation system 100 (also referred to herein as "the system") configured to perform separation, detection, and/or fractionation of one or more analytes in a sample (e.g., based on molecular weight and/or isoelectric point) according to an embodiment.

Embodiments of the fractionation system 100 described herein can be used to facilitate separation of one or more analytes in a single system, visualization and/or detection of analytes within a sample before, during, and/or after the separation, and fractionation of one or more separated analytes based on the separation and visualization and detection. Embodiments described herein can provide the functionality of pipettes and microfluidic paths, thereby enabling the separation, analysis, and/or fractionation of very small volume samples. Such apparatus and/or systems can include any suitable device, mechanism, assembly, subassembly, electronic device, actuator, and/or the like that can enable the apparatus and/or system to, for example, separate, visualize, detect, and/or fractionate any suitable target analytes.

The system 100 includes a housing 101, a probe system 102, a cartridge retainer 103 configured to receive and/or secure a capillary cartridge 104, a sample plate assembly 107, and an electronic system 108. While not shown in FIG. 1, the electronic system 108 can include a processor, a memory, a communicator, and/or a power source. The electronic system 108 can be configured to permit communications with external compute devices using any suitable mode of communication, for example, to receive/transmit data and/or instructions. In some embodiments, the system 100 can be configured such that the electronic system 108 includes any suitable system or assembly with a power source, a processor, and a memory that can be configured and/or otherwise programmed to perform one or more processes (e.g., hardware module and/or software module stored in the memory and executed in the processor) associated with performing at least a semi-automatic electrophoretic separation. Similarly, the system 100 can include any suitable fluid flow system or assembly that defines one or more fluid flow paths configured to receive a fluid such as, for example, a sample, one or more reagents, and/or the like, which can flow through the system 100 as described in further detail herein with reference to specific embodiments.

The housing 101 of the system 100 can be any suitable shape, size, or configuration and can be arranged to at least partially enclose or at least partially house any suitable component of the system 100. For example, the housing 101 can at least partially enclose the probe system 102, the sample plate assembly 107, the capillary cartridge retainer 103, and the electronic system 108. Although not shown in FIG. 1, in some embodiments, the housing 101 can be configured to form one or more portions, chambers, inner volumes, etc. that are configured to allow at least some of the components of the system 100 to be disposed therein. In some embodiments, the housing 100 can include a door configured to provide access to the inner volume defined thereby. For example, a user can open the door of the housing 100 to position a capillary cartridge 104 within the capillary cartridge retainer 103, as described in further detail herein. In some embodiments, at least a portion of the housing 101 can be light tight such that no substantial quantity of light leaks through the housing into a chamber defined by the housing. In some embodiments, the housing 101 can define at least one climate-controlled chamber. Similarly stated, the system 100 can be operable to maintain a chamber of the housing at a constant and/or preset temperature, humidity, and/or other environmental parameter (e.g., illumination, etc.).

The probe system 102 of the system 100 can be fixedly disposed within the housing 101. In some embodiments, the probe system 102 can be disposed in a predetermined and fixed position relative to the cartridge retainer 103 and/or one or more components in association with the cartridge retainer 103 or the cartridge 104 (e.g., a viewing window (not shown) defined on the cartridge, the capillary 106, etc.,). For example, the probe system 102 can be arranged within the housing 101 such that predetermined portions of the probe system 102 are aligned with and/or otherwise disposed in a desired position relative to predetermined portions of the cartridge retainer 103. In some embodiments, the probe system 102 and/or cartridge retainer 103 can include any suitable adjustment mechanism or the like to ensure a desired alignment between the probe system 102 and the cartridge retainer 103.

The probe system 102 can include any suitable device, mechanism, and/or assembly that is configured to capture and/or detect digital or analog data (e.g., images) of, for example, an analyte and/or standard and/or to detect a signal emitted by the analyte and/or standard (e.g., in a sample held in the capillary 106) such that any suitable analyses may be performed using the signal (e.g., analyses conducted by the electronic system 108). In some embodiments, the probe system 102 can include one or more emitters and one or more detectors (not shown in FIG. 1).

The emitters included in the probe system 102 can be any suitable device, member, mechanism, assembly, and/or the like that is configured to release energy (e.g., heat, photons, radiation, etc.). For example, in some embodiments, the emitters can include LEDs, arrays of LEDs, a deuterium lamp, a laser, an incandescent light source, a fluorescent light source, or any other suitable light source. The emitter, in some embodiments, can be optically coupled to the cartridge retainer 103, the cartridge 104, and/or the capillary 106 via one or more lenses, mirrors, prisms, fiber optics, and/or the like. The emitter(s) can be powered and/or excited to emit light at, for example, a predetermined wavelength and/or range of wavelengths. In some embodiments, the probe system 102 can include one or more mirrors, lenses, filters and/or the like configured to direct, focus, and/or convert the wavelength of photons emitted by the emitter(s). For example, the probe system 102 can include any suitable lens and/or filter (e.g., a TAMRA filter) that is associated with chemiluminescence, fluorescence (e.g., native fluorescence, fluorescence of label moieties, etc.), absorbance, and/or the like. In some embodiments, the probe system 102 can include a sequence of emitters, for example, a grid array of fiber optic outputs, LEDs, or the like (e.g., a column of light). In some embodiments, the probe system 102 can be configured such that the one or more emitters can be used to convey energy (e.g., excitation energy) to a sample via one or more apertures, filters, blockers, reflectors and/or refractors, etc. The energy conveyed can be configured to interact with at least a portion of a sample contained within the capillary 106 of the cartridge 104 when the cartridge 104 is retained by the cartridge retainer 103.

The detectors included in the probe system 102 can be any device that can receive or acquire a signal emitted or associated with a portion of a sample in the capillary 106 and convey data or information associated with the acquired signal to a processor (e.g., a processor included in the electronic system 108). In some embodiments, the detectors can be configured to receive signals in one form that can be transduced to another form or to data that can be transmitted to the processor. For example, the detectors can include any suitable digital or analog detectors that can capture a signal in the form of light emitted by a portion of the sample and transduce the captured signal into data (e.g., digital data conveying information related to intensity, wavelength, quality, duration of emission, etc.) that can be used to perform suitable analyses of the portion of the sample from which the signal was received. As an example, in some embodiments, one or more detectors can be and/or can include a photodiode, an array of photodiodes, a photomultiplier tube (PMT), a charged coupled device (CCD) array, and/or the like. The detectors can be used to capture an image and/or signal associated with the analyte and/or standard within a sample. In some embodiments, the detectors can be operable to capture images and/or signals emitted from the analyte and/or standard periodically and/or continuously. In some embodiments, the detectors can be operable to monitor the analyte and/or standard, in real time or substantially in real time, which can allow a user to rapidly determine whether an analyte is present in the sample, a rate of migration of a portion of the sample (e.g., during elution), an amount or activity of the analyte, a molecular weight of the analyte, and/or the like.

In some embodiments, a detector can be used during a fractionation to detect and/or image, substantially in real time, a flow of a sample through the capillary 106 of the cartridge 104 (in this instance, configured for use in fractionation based on isoelectric focusing and associated analyses) when the cartridge 104 is retained by the cartridge retainer 103. In some embodiments, a detector can be used during and/or after isoelectric focusing. For example, the detector can be used to detect the separation of analytes substantially in real time as analytes separate and focus and/or after analytes have been focused and, optionally, migrated towards an end of the capillary to be fractionated out in isolation. Similarly stated, the detector can detect a signal (e.g., fluorescence, absorbance, etc.) associated with one or more analytes included in a sample that has been separated and/or is in the process of being eluted from within the capillary 106 of the cartridge 104 (in this instance, configured for use in isoelectric focusing) when the cartridge 104 is retained by the cartridge retainer 103. As describe previously, the probe system 102 can be operably coupled to any suitable electrical or electronic circuit included in the electronic system 108 and/or associated with a remote device. The probe system 102 can be configured to send and/or receive signals from a processor and/or the like (e.g., the probe system 102 can send one or more signals to the processor or the like in the electronic system 108 to cause data associated with the captured images and/or detected signals to be stored, for example, in a memory or database). The probe system 102 can include a single detector or multiple detectors (e.g., more than two) configured to detect a portion of energy (e.g., light of specified wavelength range) produced by the emitters and/or interacted by a portion of the sample (e.g., fluorescence from a separated analyte in a sample held in capillary 106).

As described above, the system 100 is configured to receive a capillary cartridge 104 (also referred to herein as "cartridge"). In some embodiments, the system 100 is configured to receive a cartridge 104 including one or more capillaries 106 and to expose at least a portion of the cartridge 104 to negative pressure differential (e.g., produced by a vacuum source) operable to draw a volume of fluid (e.g., one or more reagents, samples, buffers, washes, detectors, analytes, ampholytes, and/or the like) from one or more wells or trays included in the apparatus and/or system into the capillary(ies) 106 of the cartridge 104.

In some embodiments, the system 100 is configured to receive the cartridge 104 including capillaries 106 and to expose at least a portion of the cartridge 104 to a positive pressure differential (e.g., produced by a pressure source) operable to inject or eject a volume of fluid (e.g., one or more reagents, samples, buffers, washes, detectors, analytes, ampholytes, and/or the like) from the capillary 106 to one or more wells or trays.

In some embodiments, the system 100 is configured to receive the cartridge 104 including one or more capillaries 106 and to expose at least a portion of the cartridge 104 to a source of applied voltage or a source of electric current that can be operable to draw a volume of fluid via electrokinetic injection (e.g., one or more reagents, samples, buffers, washes, detectors, analytes, ampholytes, and/or the like) from one or more wells or trays into the capillary 106. In some embodiments, the system 100 can be configured to expose at least a portion of the cartridge 104 to a source of applied voltage or a source of electric current that can be operable to inject a volume of fluid via electrokinetic injection (e.g., one or more reagents, samples, buffers, washes, detectors, analytes, ampholytes, and/or the like) from the capillary 106 to one or more wells or trays. Electrokinetic injection can be injection of a substance (injectate) by applying a voltage or a current via a substance in a capillary 106. An amount of the substance injected into a well or vial can depend on a mobility of components included in the substance, a diameter of the capillary 106, the applied electric field and/or the injection time (e.g., time of application of the voltage).

The cartridge 104 can include at least a body portion that is fixedly coupled to at least one capillary 106. The cartridge 104 can be any suitable shape, size, or configuration.

The capillary cartridge retainer 103 (also referred to herein as "cartridge retainer") is fixedly disposed within the housing 101. For example, in some embodiments, the cartridge retainer 103 can be coupled to a frame or the like that maintains the cartridge retainer 103 in a substantially fixed position within the housing 101. In some embodiments, the cartridge retainer 103 can also be coupled to and/or otherwise disposed in a fixed position relative to the analysis system 102, as described in further detail herein.

The cartridge retainer 103 can be any suitable shape, size, or configuration. For example, the cartridge retainer 103 can include, for example, a set of sidewalls that define an inner volume configured to receive at least a portion of a capillary cartridge 104 (also referred to herein as "cartridge"). More particularly, the cartridge retainer 103 can have or define a substantially C-shaped cross-section with at least one side of the cartridge retainer 103 being substantially open. A user can insert the cartridge 104 through the substantially open side of the cartridge retainer 103 to position at least a portion of the cartridge 104 within the inner volume. In some embodiments, the cartridge retainer 103 can include a latch mechanism suitable to form a friction fit, a snap fit, a threaded coupling, and/or the like with at least a portion of the cartridge 104 to couple the cartridge 104 to the cartridge retainer 103. In other words, the cartridge retainer 103 at least temporarily couples to the cartridge 104 when the portion of the cartridge 104 is inserted into the inner volume to maintain the cartridge 104 in a substantially fixed position relative to the cartridge retainer 103.

The cartridge retainer 103 can be configured to receive the cartridge 104 in a predetermined orientation (e.g., only one orientation or way). Although not shown in FIG. 1, the cartridge retainer 103 can include any suitable alignment feature or sensor configured to engage and/or sense a portion of the cartridge 104 as the cartridge 104 is positioned within the cartridge retainer 103. More particularly, the cartridge retainer 103 can include, for example, any number of features (e.g., protrusions, openings, grooves, etc.), assemblies, mechanisms, sensors, and/or the like, each of which engage and/or sense a portion of the cartridge 104 to ensure the cartridge 104 is retained within the cartridge retainer 103 at a desired position and/or in a desired orientation.

The cartridge 104 is configured to receive and house a capillary 106 in a specified orientation such that when the cartridge 104 is engaged with the cartridge retainer 103 the capillary 106 can be engaged with one or more components of the system 100 to enable forming a fluid path that can be used to manipulate a sample (e.g., draw the sample, separate analytes in the sample, analyze one or more constituents of the sample, fractionate one or more analytes, etc.)

The capillary 106 is configured to be placed in fluid communication with one or more fluid reservoirs (e.g., disposed in the cartridge body and/or disposed in or defined by a reagent tray or the like). In some embodiments, the one or more fluid reservoirs can be wells or the like containing a fluid with constituents having any of the chemistries described above. In some embodiments, the one or more fluid reservoirs can be wells (e.g., sample collection wells) having solutions for separation and/or fractionation of analytes including running buffers (e.g., acid or base solutions), chemical mobilizers, etc. as described herein.

The capillary 106 of the cartridge 104 defines a lumen that receives at least a portion of a sample, solution, reagent, analyte, and/or any other suitable fluid or gel. In some embodiments, the capillary 106 can include a separation matrix configured to support generation of a pH gradient and/or separation of analytes (e.g., via isoelectric focusing). In some embodiments, the capillary 106 of a cartridge 104 can be an elongate member having a rounded or circular cross-sectional shape or a polygonal cross-sectional shape (e.g., trapezoidal, rectangular, square, pentagonal, octagonal, etc.). In some embodiments, the shape and/or size of the lumen defined by the capillary 106 can be based at least in part on the sample, the sample volume, and/or the type of analysis (e.g., with an inner diameter of about 10 micrometers or "microns" ($\mu$m) to about 1000 $\mu$m). For example, a capillary 106 having a relatively small inner diameter can be associated with and/or otherwise used for relatively low sample volumes, which can be suitable for expensive samples or reagents. Conversely, a capillary 106 defining a relatively larger inner diameter can be associated with and/or otherwise used for relatively high sample volumes, which in some instances, can result in improved signal detection or the like. In other embodiments, the inner diameter can be based at least in part on the analysis to be performed (e.g., molecular weight-based separation, isoelectric focusing, etc.). In some embodiments, capillaries with multiple segments having different inner diameters (including transition segments with variable inner diameter) can be used, as described herein.

The capillary 106 can be any suitable shape, size, volume, or configuration and can be formed from any suitable material (e.g., glass, plastic, silicon, fused silica, gel, metal, carbon nanotubes, PYREX™ (amorphous glass), and/or the like) that allows a liquid and/or dissolved molecules to flow through the lumen. The capillary 106 can have any suitable length and any suitable inner diameter and a suitable outer diameter. For example, in some embodiments, the capillary 106 can have a length of approximately 50 to 120 mm (e.g., a length as small as 5 mm, 10 mm, 20 mm, 30 mm, 40 mm, 50 mm, 60 mm 70 mm, 80 mm, 90 mm, 100 mm, 110 mm, 120 mm, or any suitable length therebetween). In some embodiments, the capillary 106 can have a length of approximately 100 mm to 1000 mm (e.g., a length as small as 100 mm, 200 mm, 300 mm, 400 mm, 500 mm, 600 mm 700 mm, 800 mm, 900 mm, 1000 mm, 1100 mm, or any suitable length therebetween). In some embodiments, the capillary 106 can have a single constant inner diameter and/or outer diameter. For example, in some embodiments the capillary can have an inner diameter of approximately 320 to 530 $\mu$m (e.g., an inner diameter of 320 m, 420 m, 530 m, or any suitable inner diameter therebetween).

In some embodiments, the length of the capillary can be based at least in part on factors such as sample size or volume and the extent of sample separation when resolving the analyte or analytes of interest (e.g., between about 2 centimeters (cm) and about 20 cm), where a longer capillary can result in increased separation of samples, which in turn, can improve resolution of complex mixtures and/or mixtures having a low abundance of analytes. In some embodiments, the capillary 106 can have any suitable diameter which can be based at least in part on factors such as sample size or volume, an extent of sample separation when resolving the analyte or analytes of interest, a speed of separation, a speed of migration for elution or fractionation of analytes in a sample (e.g., between 1 mm/min and 5 mm/min), where a capillary with a larger diameter can result in larger volumes and/or increased speed of migration of separated analytes in the samples, which in turn, can improve or increase a fractionated amount of a separated analyte, and/or a speed of fractionation of the analytes from a complex mixtures and/or mixtures in the sample. The diameter of the capillary can be based at least in part on factors such as sample size or volume, the extent of sample separation desired for an analyte or analytes of interest, and/or a speed of fractionation.

In some embodiments, the capillary 106 can include two or more portions each portion associated with a specified length and location and each portion having a specified variable inner diameter and/or outer diameter, as described in further detail in following sections. In some embodiments, the capillary 106 can be made as a unibody element. In some embodiments, the capillary 106 can be made by joining two or more portions together.

In some embodiments, the cartridge retainer 103 can include and/or otherwise can be coupled to any suitable assembly, mechanism, device, and/or the like configured to engage the cartridge 104 to control, for example, a flow of fluid through at least a portion of the cartridge 104. For example, in some embodiments, the cartridge retainer 103 can include and/or can be coupled to a vacuum source or assembly (not shown in FIG. 1). The vacuum source or assembly can be configured to be brought in fluidic connection with the cartridge 104 via suitable connection (e.g., tubing, port, and/or the like) and the vacuum source or assembly can be configured to produce a negative pressure within a volume of the cartridge 104 such as, for example, within a lumen of a capillary 106 or a portion of a fluidic path defined in the cartridge and/or the like. Said in another way, the vacuum source can be fluidically coupled to a portion of the cartridge retainer 103 via a port or a tubing or the like that places the vacuum source in fluid communication with the lumen of the capillary 106 in the cartridge 104 when the cartridge 104 is retained by the cartridge retainer 103.

In some instances, the vacuum source can be a pressure source capable of applying positive and/or negative pressure differential. For example, the pressure source can apply a negative pressure differential to draw a sample or substance from a sample well into the capillary 106. As another example, the pressure source can apply a positive pressure differential to inject or elute a portion of the sample or substance (e.g., a separated analyte or set of analytes) from the capillary 106 and into a collection well. In some embodiments, the pressure source can be activated and/or controlled (e.g., by a manual switch or controlled and/or by an electrical switch or controller included in an electrical circuit and controlled by a processor) to produce and/or modulate a negative pressure of a desired magnitude within the cartridge 104, as described in detail below with reference to specific embodiments. In some embodiments, the cartridge retainer 103 can include a device or mechanism configured to engage the cartridge 104 to selectively limit a bulk flow of fluid through a portion of the cartridge 104. For example, the cartridge retainer 103 can include an actuator or the like that is selectively placed in contact with a pinch valve or the like included in the cartridge 104 to limit and/or substantially prevent a bulk flow of fluid through, for example, a lumen of a capillary included in the capillary cartridge 104.

In some embodiments, the cartridge 104 can include one or more running buffer reservoirs 105 that can be configured to hold one or more running buffers that can be used to probe, separate, analyze, and/or fractionate one or more analytes in a sample held in the capillary 106. As an example, a first running buffer held in the running buffer reservoir 105 can include a buffer having a first pH and/or having a specified concentration of desired ions. For example, in some embodiments, the running buffer reservoir 105 can hold a specified quantity of an acid with a desired pH. The capillary 106 can be positioned such that a lumen of the capillary 106 at a first end or a proximal end of the capillary 106 is fluidically and/or ionically coupled with the running buffer held in the running buffer reservoir 105. The acid and/or its pH may be selected such that one or more analytes included in a sample, that is drawn into the capillary 106, can be separated using techniques like isoelectric focusing by taking advantage of the pH of the running buffer. That is, in some embodiments, the sample in the capillary can be ionically coupled via a first end (e.g., a proximal end) to a first running buffer in the running buffer reservoir and having a first pH. The sample in the capillary can be ionically coupled via a second end (e.g., a distal end) to a second running buffer in a well and having a second pH different than the first pH. The well holding the second running buffer can, for example, be in the sample plate held by the sample plate assembly 107, and the distal end of the capillary may be configured to be dipped into the well by the system 100. The first running buffer at the first pH and the second running buffer at the second pH can induce a pH gradient to be established along the capillary lumen and through the sample. The pH gradient can cause one or more analytes in the sample to separate and/or migrate along the gradient to be positioned and/or accumulated at their respective equilibrium pH based on the ionic balance of the respective analytes.

Following separation and/or focusing of the one or more analytes in the sample along the pH gradient the one or more analytes can be mobilized and eluted using any suitable process including hydrodynamic mobilization and/or chemical mobilization. Hydrodynamic mobilization can refer to a mobilization of analytes due to movement of fluids (e.g., due to a flow driven by gravitational forces acting on fluids in a vertically oriented capillary, a flow driven by a pressure differential, and/or the like). In some instances, the application of electric field can be continued during hydrodynamic mobilization, which can help to maintain separation between the analytes. Chemical mobilization can refer to a mobilization of analytes by a process in which an anolyte (electrolyte on the anode side of the capillary 106) or a catholyte (electrolyte on the cathode side of the capillary) can be replaced by another electrolyte with a high ionic strength and/or a different pH compared to the running buffers associated with the anode side or cathode side of the capillary 106. The electrolyte with the high ionic strength and/or different pH can be introduced via a chemical mobilizer (also referred to herein as an elution buffer) in conjunction with an applied electric field between a first running buffer and the chemical mobilizer via the capillary 106.

A chemical mobilizer can be a buffer that provides ions that can migrate into the capillary 106 and disrupt the pH gradient in the capillary 106 to again impart a charge to the separated analytes that may have been rendered neutralized and stable. When a one end (e.g., a distal end) of the capillary 106 is disposed in a chemical mobilizer the electrolyte can be introduced into the capillary 106 and can disrupt the pH gradient. Ampholytic analytes in the now-disrupted pH gradient can therefore experience a force causing them to migrate and/or be eluted. In some embodiments, the cartridge 104 can be configured such that the first running buffer in the running buffer reservoir 105 can be used to elute and/or fractionate one or more analytes in a sample held in the capillary 106 in conjunction with a chemical mobilizer. As an example, the first running buffer held in the running buffer reservoir 105 can include a buffer having a first pH and/or having a specified concentration of desired ions. For example, in some embodiments, the running buffer reservoir 105 can hold a specified quantity of an acid with a desired pH. A collection well can include a chemical mobilizer with a buffer having a third pH and/or having a third specified concentration of a desired set of ions, for example a specified quantity of base with a desired pH.

In some implementations, a single chemical mobilizer can be chosen to elute separated analytes in a capillary 106. One or more wells holding the chemical mobilizer can, for example, be in the sample plate held by the sample plate assembly 107, and the distal end of the capillary may be configured to be disposed into the well holding the chemical mobilizer by the system 100. The chemical mobilizer can induce elution of the separated analytes along the pH gradient generated during the separation phase (e.g., established using the second running buffer) such that analytes focused in a specified portion of the pH gradient can be collected in the collection well. In some implementations, multiple wells can contain the chemical mobilizer such that the distal end of the capillary 106 can be moved from collection well to collection well, and a specified portion of the separated one or more analytes can be collected in each (or at least a subset) of the wells. Movement of the capillary 106 from collection well to collection well can be coordinated (e.g., with real-time imaging of the column) such that separated analytes with slightly different pI values can be tracked and/or selectively eluted and collected as fractions in separate collection well via chemical mobilization.

Some of the properties of a chemical mobilizer/elution buffer to be considered when choosing chemical mobilizers for mobilizing analytes include: (1) compatibility with mass spectrometry (e.g., a volatility of chemical mobilizers can help remove the chemical mobilizer components during electrospray during a mass spectroscopy analysis following fractionation and collection), (2) a pH that permits stable storage of the analytes (e.g., proteins) that may remain in the chemical mobilizer after elution (e.g., a pH range of 4 to 9, in some implementations, a pH range of 5 to 8), (3) sufficient buffer capacity to support the current during chemical mobilization. In some implementations, a sufficient buffer capacity can be achieved by increasing a concentration of ions in the chemical mobilizer/elution buffer. Some example chemical mobilizers include NaCl, Acetic Acid, Acetate salt, Formic Acid, Phosphate Salt, Phosphoric Acid, Ammonium Acetate, and Formate. Ammonium Acetate is an example chemical mobilizer that can have a pH 6.7 and can be used to mobilize all analytes (e.g., proteins) in a sample. Chemical mobilizer can be chosen at a suitable concentration based on desired mobilization and/or elution parameters (e.g., speed, precision, etc.) As an example, NaCl can be chosen as a chemical mobilizer at a concentration of about 10 to 200 mM, acetic acid can be used at a concentrations from about 20 mM to 200 mM, acetate salt (e.g., ammonium) can be used at a concentration from about 1 mM to 20 mM, formic acid can be used at a concentration from about 0.01% to 1%, phosphate salt can be used at a concentration from about 0.5 mM to 20 mM, formate can be used at a concentration from about 0.5 mM to 20 mM.

The cartridge retainer 103 can also include any number of electrical contacts (not shown in FIG. 1) or the like configured to electrically couple a portion the cartridge 104 to an electrical or electronic assembly included in the system 100. For example, in some embodiments, the cartridge retainer 103, the cartridge 104, and/or the capillary 106 can include one or more electrically conductive contact members, clips, surfaces, etc. that are placed in contact with an associated electrically conductive contact member, clip, surface, etc. of the cartridge 104 when the cartridge 104 is retained therein. In some embodiments, at least a portion the cartridge 104 can be formed from an electrically conductive material such as stainless steel, electrically conductive plastic or the like. Thus, when the cartridge 104 is retained in a desired position within the cartridge retainer 103 the one or more electrically conductive members or the like of the cartridge retainer 103 contact one or more predetermined electrically conductive portions of the cartridge 104, which in turn, places the cartridge 104 in electrical or electronic communication with the electrical and/or electronic assembly included in the system 100. By way of example, the cartridge retainer 103 can electrically connect a conductive capillary of the cartridge 104 and/or a conductive fluid within a lumen of a capillary to the electrical and/or electronic assembly of the system 100, as described in further detail herein.

In some embodiments, at least a part of the cartridge 104 and/or the capillary 106 can be electrically conductive. The electrically conductive part of the cartridge 104 and/or the capillary 106 can be formed from any suitable electrically conductive material. For example, the electrically conductive part can be formed from a metal including copper, platinum, stainless steel, electrically conductive microplate plastic, carbon-infused plastic, an electrically conductive polymer, and/or any other suitable material. As an example, in some embodiments, the cartridge 104 can include a capillary 106 with a metal tip at the distal end of the capillary that is electrically conductive. When the capillary is dipped into a solution (e.g., in a collection well or a reagent well in a sample plate) the metal tip can be disposed in the solution and can be used to provide an electrical connectivity between an external source of electrical power and the solution and/or the lumen of the capillary. The metal tip can be used to apply a voltage through the solution that is occupying the lumen of the capillary and that optionally contains a pH gradient between ionically coupled running buffers (e.g., disposed on opposite sides of the capillary). Said in another way, the metal tip can be used to provide a voltage across the length of the capillary 106 and between solutions and/or buffers that are coupled to the proximal and distal ends of the capillary 106, respectively, such that analytes in a sample held in the lumen of the capillary 106 can be separated and/or fractionated by applying a voltage.

In some embodiments, the cartridge 104 can include one or more electrical leads or points of electrical connectivity that are configured such that the first running buffer and/or the second running buffer that is ionically coupled to the sample in the capillary can each be also electrically coupled to a power source (e.g., a power source included in the electronic system 108). In some embodiments, as described in further detail in the following sections, the first running buffer can be electrically coupled to a first electrical lead electrically coupled to the running buffer reservoir and a voltage source, and the second running buffer (e.g., in a well in a sample plate held by the sample plate assembly 107) can be electrically coupled to a second lead positioned at the distal tip on the capillary 106 holding the sample based on the distal end of the capillary being dipped into the second running buffer. The second lead positioned at the distal tip of the capillary 106 can be configured to be electrically coupled to the voltage source such that the system 100 can provide apply a specified voltage across the first lead and the second lead, thereby applying the voltage between the first running buffer and the second running buffer via the sample held in the lumen of the capillary 106. In some instances, the voltage applied can be selected to induce isoelectric focusing of the components included in the sample such that one or more analytes and/or standards included in the sample can separate and/or migrate to their respective isoelectric points (pI) (i.e., the pH at which each analyte has no net charge and therefore is at equilibrium with no more net movement along the pH gradient) along the length of the capillary based on their respective ionic balance with respect to the pH gradient generated between the first running buffer and the second running buffer.

As described previously, the capillary 106 can be of any suitable shape, size, or configuration and can be arranged to be received by the cartridge 104 and to have a lumen that can be made continuous with a fluidic path that is defined in the cartridge 104 (e.g., a lumen that is configured to be arranged in fluidic connection with a tubing that is coupled to a vacuum source, to a first running buffer in a running buffer reservoir, to a sample well in a sample well plate, to a second running buffer in a well included in a sample well plate, etc.

Some embodiments described herein relate to capillary-containing cartridges suitable for use with capillary electrophoresis instruments, such as Maurice by ProteinSimple®. U.S. Pat. No. 10,794,860, issued on Oct. 6, 2020 and entitled "Systems and Method for Capillary Electrophoresis, Isoelectric Point, and Molecular Weigh Analysis," the entire disclosure of which is hereby incorporated by reference, includes additional disclosure of a suitable capillary electrophoresis instrument and cartridges suitable for capillary electrophoresis. Embodiments described herein generally relate to cartridges that include a capillary 106 that can serve or that includes portions that can serve to transfer solutions, hold a sample including analytes and/or standards, support a separation of one or more analytes/standards in the sample, and elute one or more separated analytes via fractionation. The capillary 106 can be configured to transfer a buffer or maintain fluidic contact with one or more buffer reservoirs such that the capillary 106 can be to be in contact with a buffer reservoir(s). The capillary 106 can be configured to transfer a sample and/or receive the sample into a lumen of the capillary 106 such that the contents in a lumen of the capillary can be subjected to an applied voltage to form a pH gradient.

In some embodiments, the cartridge 104 and the capillary 106 can be configured such that the capillary 106 is in a substantially vertical orientation with respect to gravity with the distal end protruding away from the cartridge 104 such that a portion of the distal end can be removably disposed in any suitable well, vial, reservoir, and/or the like that can be introduced at the correct position with reference to the capillary 106 and/or the cartridge 104. In some embodiments, the protruding end (e.g., a distal end) of the capillary 106 can be configured to be disposed in sample reservoir in a sample well plate and/or a buffer reservoir in collection wells (e.g., in a sample well plate).

In some embodiments, the proximal end of the capillary 106 can be configured to be coupled to a suitable mechanism that can be used to load a sample into the lumen of the capillary 106. For example, during a loading step suction applied through a sheath interface or a tubing coupled to the proximal end of the capillary 106 via the vacuum source can provide a negative pressure to draw a sample or buffer from a sample or buffer reservoir and bring the sample or buffer into the lumen of the capillary 106.

The capillary 106 can be configured for separation of analytes included in the sample, for example via isoelectric focusing when an electric potential (i.e., voltage) is applied across the proximal and distal ends of the capillary 106. The electric potential can be applied across the lumen of a substantially vertically oriented capillary 106 via a first or top running buffer reservoir and a second or bottom running buffer reservoir. In some embodiments, the capillary 106 can be configured such that one end of the capillary 106 (e.g., a proximal end) can be disposed in a first running buffer reservoir included in the cartridge 104. The other end protruding from the cartridge 104 can be configured to be disposed in a second running buffer reservoir in a sample well included in a sample well plate. Said in another way, the top running buffer reservoir can be disposed in the cartridge 104, and a top end of the capillary 106 can be disposed in the top running buffer reservoir. A bottom of the capillary 106 can be disposed in a bottom running buffer reservoir, which can be disposed in a sample plate that is a portion of or accessed by the system 100. Similarly stated, the capillary 106 can extend from the cartridge and be "dipped" into a bottom running buffer reservoir.

In some embodiments, one or both ends of the capillary 106 can be configured to include a portion of a porous membrane (not shown in FIG. 1) having a predefined pore size and covering an access to the lumen of the capillary 106. Some embodiments can include membranes on both ends of the capillary used to separate the analytes. Some embodiments can include a membrane on just one end of the capillary 106. For example, the proximal (e.g., top) end of the capillary 106 that is disposed in a first running buffer held in a first running buffer reservoir can include a porous membrane that reduces movement of the first running buffer into the capillary 106, for example due to a gravitational and/or capillary forces. The porous membrane(s) can serve as a hydrodynamic barrier preventing the first running buffer (e.g., acid) and/or the second running buffer (e.g., base) from entering the capillary during separation. The ions such as $H^+$ and $OH^-$ can, however, freely transport through the membrane(s) under electric field allowing the separation (e.g., via isoelectric focusing process) to occur. In addition to the membranes, some embodiments can include one or more valves located at or close to one or more ends of the capillary 106 (e.g., a loading end of the capillary used to load sample, an elution end of the capillary used to elute fractions). The valve at a loading end/elution end can be configured to be opened during sample loading and/or fraction elution and to be closed during the separation phase to minimize hydrodynamic flow during separation. In some embodiments, the porous membrane may be configured to be removed during elution (e.g., using a suitable actuation).

In some embodiments, a porous membrane at a distal (e.g., bottom) portion of the capillary, through which sample is injected and/or fractions eluted, can have a predefined selectivity to reduce infiltration of the first running buffer into the lumen of the capillary 106 while allowing analytes and/or protons and/or hydroxyl ions to pass therethrough under an applied electric field. In some embodiments, the porous membrane can be in the form of a tubing coupled to one end (e.g., the proximal end) of the capillary, and also referred to as "membrane tubing". Such a membrane tubing defines a lumen through which fluid can flow hydrodynamically when a pressure difference exists between the two ends of the membrane tubing. In contrast, the porous wall that encloses the lumen can permit transport of ions (e.g., by electrophoresis or diffusion) while substantially restricting hydrodynamic flow. In some embodiments, the membrane tubing can be configured to connect a vacuum source to the capillary 106 (e.g., at the proximal end of the capillary 106) and can be in contact with and/or submerged in the running buffer reservoir. The porous membrane or membrane tubing can have a molecular weight cut-off (MWCO) of approximately 10 kDa to 500 kDa in some embodiments. Some such embodiments, the porous membrane can be configured to be used with a cartridge 104 with a capillary 106 that has a single inner diameter of about 320-530 μm with a length of about 60-120 mm. Some such embodiments can be configured to increase a sample loading capacity while at the same time maintaining an advantage of real time monitoring of progress of separation of analytes, for example via isoelectric focusing. In some embodiments, the porous membrane can be selected to enable effective mobilization speed during chemical mobilization and elution of fractions of the sample. The porous membrane can be selected to reduce a disruption of a pH gradient generated during separation at the stage of mobilization and elution of fractions.

In some embodiments, the selection of the porous membrane can be based on a size location, and/or orientation of the running buffer reservoir (e.g., 500 μl-4000 μl), a volume associated with the membrane tubing, and/or an inner and/or outer diameter of the capillary 106. For example, the volume associated with the membrane tubing can be a portion of tubing of approximately 300 μm to 700 um inner diameter, and a length of approximately 0.5 mm to 2 mm. In some instances, the porous membrane, the running buffer reservoir (and the cartridge associated with a running buffer reservoir), and the capillary can be selected to suitably match each other to achieve a desired separation, mobilization, and/or elution of analytes (e.g., a target efficiency of separation, a target speed of mobilization, etc.).

A size, location, and/or orientation of the running buffer reservoir can affect a hydrodynamic flow associated with contents of the lumen of the capillary 106, as does the porous membrane (e.g., pore size of the membrane). For example, a volume and/or size of the running buffer reservoir that may be located and/or oriented at a vertically elevated position with respect to a capillary 106 can impart a hydrodynamic flow based on gravitational forces acting on the running buffer released from the running buffer reservoir. The pore size of the porous membrane can not only affect the degree of hydrodynamic flow but also the efficiency of ion-exchange (i.e., level of electric current under applied voltage). In some embodiments, the running buffer reservoir can be configured to hold a first running buffer which for example can be an acid. The running buffer reservoir can thus serve as a supplier of protons during the separation and mobilization process. The larger the size or volume of the sample to be separated, which can depend inner diameter of the capillary 106, the larger may be the need for protons. Thus, the inner diameter of the capillary 106 can affect the sample size, which can determine a size of running buffer reservoir that may be used to supply a suitable number of protons that can be supplied.

When a sample is introduced into the cartridge 104, the sample can distribute in both the lumen of the capillary 106 as well as the volume associated with the membrane tubing. As described previously, the lumen of the capillary 106 can include a separation matrix. Under applied voltage, if the separation matrix includes no spacers, which are electrolyte solution added to a capillary to electrophoretically block specific segments of the capillary from being used to focus analytes (e.g., Iminodiacetic acid (IDA) and/or Arginine), the length of the pH gradient can extend over the entire length of the capillary and the length of the portion of tubing that includes the volume associated with the membrane tubing. The inner diameter and length of the membrane tubing can thus affect the distribution of the pH gradient, subsequently, the quality of separation as well as the quality of mobilization. Therefore, the volume associated with the membrane tubing can be an important factor in the quality of separation and/or mobilization. Additionally, the inner diameter of the porous membrane tubing can be selected to match the outer diameter of the capillary 106 such that the junction between the membrane tubing and the capillary 106 is sealed and does not become a defect area that may encourage potentially detrimental effects (e.g., bubble formation).

In some embodiments, the capillary 106 can include one or more valves located at any suitable position along the length of the capillary 106 and operational to open and/or close fluid flow through the capillary 106 at any desired time. For example, the capillary 106 can include a valve located at or near a distal end such that the valve can be opened during loading the capillary 106 with a sample and the valve can be closed following loading and while separating the analytes (e.g., via isoelectric focusing) to reduce or minimize hydrodynamic flow (e.g., flow caused by gravity due to the vertical orientation of the capillary 106) during separation. In some embodiments, the capillary 106 and/or the cartridge 104 can be configured to include one or more adaptations to permit an application of electric potential across the lumen of the vertically oriented capillary 106 via the first or top running buffer reservoir and the second or bottom running buffer reservoir, as described in further detail herein. For example, in some embodiments, as described previously, the capillary 106 and/or the cartridge 104 can include one or more electrical contacts that can be used to connect to a source of electrical power. For example, the capillary 106 and/or the cartridge 104 can include one or more electrical contacts disposed at or near the proximal and/or the distal end of the capillary 106.

The sample plate assembly 107 of the system 100 can be any suitable shape, size, or configuration and can be arranged to receive, house, and/or store at least a portion of a sample plate or a reagent tray (not shown in FIG. 1). For example, the reagent tray or sample plate can hold and/or otherwise define a set of vials, wells, well plates, microwell plates, troughs, and/or the like (any of which may be generically described as a "well" or "microwell"). The wells and/or microwells can be any suitable size and can be disposed along and/or otherwise defined by a surface of the reagent tray in any suitable arrangement. Although specific examples of reagent trays are described herein, the sample plate assembly 107 can be configured to receive and/or include any suitable reagent tray of similar size and/or shape that can define any number and/or any arrangement of wells and/or microwells. The wells and/or microwells included in or defined by the reagent tray can contain and/or receive any suitable volume of a solution, fluid, gel, lysate, buffer, sample, analyte, ampholyte, agent, reagent, protein, matrix, and/or the like. In some embodiments, the wells and/or microwells can receive a vial or the like containing a volume of any suitable fluid. In some embodiments, the sample plate assembly 107 and/or a portion of the sample plate assembly 107 is electrically conductive and electrically coupled to the electrical and/or electronic assembly 108 included in the system 100. In such embodiments, the sample plate and/or a portion of the sample plate can also be electrically conductive and can facilitate an electrical connection to a fluid disposed within the sample plate through the coupling of the sample plate to the sample plate assembly 107.

At least a portion of the sample plate assembly 107 is movably disposed within and/or movably coupled to the housing 101. In some embodiments, the sample plate assembly 107 can be movably disposed in the housing 101 such that the system 100 can automatically or semi-automatically manipulate a sample plate with respect to the cartridge retainer 103. The sample plate assembly 107 can be configured to move relative to the cartridge retainer 103 to place the capillary 106 of the cartridge 104 in fluid communication with a reagent or sample or buffer volume in one or more vials or wells in a sample plate manipulated by the sample plate assembly 107. In some embodiments, the system 100 can be configured such that the sample plate assembly 107 can be moved relative to the cartridge retainer 103 such that the distal end of the capillary 106 can be sequentially disposed in a set of vials or wells that include a sample, a running buffer, an elution reagent, a chemical mobilizer, and or the like.

For example, the sample plate assembly 107 can be movably coupled to one or more tracks, racks, lead screws, slides, pistons, and/or the like that can be operable to move the sample plate assembly 107 relative to the housing 101. The sample plate assembly 107 (or at least a sample vial or at least a reagent tray included therein) can be moved in a direction closer to or further from the cartridge retainer 103, as indicated by the arrow AA in FIG. 1. In other words, the sample plate assembly 107 can be moved in a direction parallel to an axis defined by the capillary 106 of the cartridge 104 when the cartridge 104 is retained by the cartridge retainer 103. In addition, the sample plate assembly 107 can be moved in one or more directions along a plane normal to the cartridge retainer 103, as indicated by the arrow BB. That is to say, the sample plate assembly 107 (or the sample plate included therein or at least a vial or well from the sample plate) can be moved along a plane normal to the axis defined by the capillary 106 of the cartridge 104 when the cartridge 104 is retained by the cartridge retainer 103. Said another way, the sample plate assembly 107 (or the sample plate included therein or at least a vial from the sample plate) can be moved within the housing 101 in the X-direction (e.g., left or right), the Y-direction (e.g., up or down), and the Z-direction (e.g., front or back) relative to the cartridge retainer 103.

In this manner, the sample plate assembly 107 is configured to move at least the sample plate or at least a vial or well from the sample plate (not shown in FIG. 1) relative to the cartridge 104 retained by the cartridge retainer 103 to dispose at least a distal end portion of the capillary 106 of the cartridge 104 in the wells, microwells, vials, and/or the like of the sample plate. Moreover, the sample plate assembly 107 can move at least the vial well or sample plate through any suitable number of positions relative to the cartridge 104 and/or cartridge retainer 103 to place the capillary 106 in any of the wells, microwells, and/or vials included in the sample plate, or any suitable combination thereof. The sample plate assembly 107 can be moved to draw solutions/sample into the capillary 106 and/or to elute fractions from the capillary 106 and into collection wells, using any suitable method including pressure-based injection, pressure-based elution, chemical injection, chemical mobilization, electrochemical injection, electrochemical mobilization, etc.

For example, with the capillary 106 in fluid communication with the vacuum source (as described above), a negative pressure can be produced within the capillary 106 that is operable to draw a volume of fluid, such as those described above, from any suitable well or wells of the reagent tray and into the capillary 106. In some instances, an electric field can be applied across the lumen of the capillary 106, which can apply an electrokinetic force is operable to draw charged moieties into the capillary 106 via electrokinetic injection, from any suitable well or wells of the reagent tray and into the capillary 106. In some embodiments, a well, microwell, vial, etc., can be fluidically coupled to a positive pressure source via a pressure conduit (not shown in FIG. 1) inserted into the well, microwell, vial etc. with the capillary 106. The sample plate assembly 107, the capillary 106, and/or a portion of the cartridge 104 can be operable to seal the well, microwell, vial, etc. against the cartridge 104 such that a positive pressure can urge fluid from the well, microwell, vial etc. into the capillary 106.

In some embodiments, the system 100 can be configured to manipulate the sample plate assembly 107 such that a portion of the distal end of the capillary 106 can be disposed in a sample reservoir in a sample plate at a first time and the suction or electrokinetic force is applied to draw the sample, and then the capillary 106 can be disposed in a in a second running buffer reservoir in a sample well plate. In some instances, the sample plate assembly 107 can be configured to be manipulated such that the proximal end of the capillary distal end capillary 106 can be configured to be disposed in sample reservoir in a sample well plate and/or a buffer reservoir in a sample well plate. Suction applied through a sheath interface of the capillary 106 or a tubing coupled to the proximal end of the capillary 106 via the vacuum source can draw sample/buffer from such reservoirs and bring the sample/buffer into the lumen of the capillary 106. Then the system 100 can be manipulated to perform a separation of analytes in the sample (e.g., via isoelectric focusing by applying a voltage across the proximal and distal ends of the capillary while top and bottom running buffers induce a pH gradient across the capillary). The separated analytes can be analyzed to determine a degree of separation that can be measured between each separated analyte. The analysis can be conducted using the probe system 102 and/or electronic system 108.

The separated analytes can be mobilized to be eluted using any suitable mechanism or driving force. For example, the separated analytes can be mobilized to migrate towards the distal end of the capillary 106 at a specified rate using an applied positive pressure at the proximal end of the capillary 106. Based on the measured separation between analytes an expected rate or duration of elution of each analyte can be calculated and the sample plate assembly 107 can be manipulated to introduce isolated collection vials or collection wells in the sample plate to receive each eluted analyte or fraction as a product of fractionation. In some instances, the analytes separated in the capillary 106 can be simultaneously or near-simultaneously detected and/or visualized during the elution phase to monitor a degree of separation and/or a relative location of each analyte (e.g., peak of each distribution corresponding to each analyte)

As another example, the separated analytes can be induced to migrate towards the distal end of the capillary 106 by manipulating the sample plate assembly 107 such that a set of collection wells or a collection vials having chemical mobilizers are sequentially introduced for the distal end to be disposed in. The set of collection well with chemical mobilizers may be configured such that each collection well includes a chemical mobilizer (e.g., the same or different chemical mobilizers) configured to disrupt the pH gradient formed during separation. The chemical mobilizers can be carefully selected to induce chemical mobilization to draw out and elute the most distal separated analyte or analytes. The chemical mobilizers can be used to carefully draw the desired portion of the separated sample while not substantially drawing the next subsequent separated analyte that is undesired to be mixed with the collected fraction of analyte or analytes. For example, each collection well can contain a buffer configured to incrementally decrease the pH gradient across the capillary such that analyte(s) migrate towards the sample plate and/or into the collection well(s).

In some instances, one or more of the separated analytes can be electrochemically mobilized and/or induced to migrate towards the distal end of the capillary 106 to be eluted. The elution can be monitored, and/or controlled as desired. For example, the capillary 106 can be visualized at a viewing window and a rate of mobilization and/or a rate of elution can be controlled by modifying an elution rate, an elution volume, an elution duration, etc. Any suitable driving force can be used including pressure-based elution, chemical mobilization, electrochemical mobilization, etc. In some instances, the distal end of the capillary 106 can be disposed in a collection well with a second running buffer different from the first running buffer in a running buffer reservoir 105 (e.g., an acid in an acid tank) in which the proximal end of the capillary 106 is disposed and applying an electric field.

A sequence of collection wells can be included in a sample plate with each collection well including a chemical mobilizer such that the distal portion of the capillary 106 can be sequentially disposed in each successive collection well. To elute fractions using chemical mobilization, when the distal end of the capillary 106 is disposed in each well an electric field can be applied such that separated analytes from the distal end to the proximal end of the capillary 106 can be sequentially eluted into each successive collection well. In some instances, optionally the speed of elution can be varied (e.g., increased or decreased) during the elution phase, based on selection of chemical mobilizers, use of additional hydrodynamic mobilization, etc., to further control elution and/or fraction collection (e.g., speed up, slow down, and/or cease elution, etc.). Chemical mobilizers can be selected to completely elute analytes separated along a pH gradient, for example, by sequentially disposing a distal end of the capillary in collection wells containing a chemical mobilizer until all the analytes are eluted in fractions. The migration of a target fraction can be monitored as it migrates towards a target collection well. A sample collection plate can move to place a distal end of the capillary 106 into a different collection well containing a chemical mobilizer at each instance when a separate fraction is to be collected. Voltage can be applied when the distal end of the capillary is disposed in the collection well such that the target fraction can be migrated towards the distal end of the capillary 106 and eluted out into the collection well. This process can be completed to collect any suitable number of fractions.

In some instances, optionally, a positive or negative pressure can be applied during elution to either further induce migration and elution or to counteract migration (e.g., hydrodynamic migration or migration due to effects of gravity) at various stages of the elution phase or fraction collection phase. In some instances, a simple pressure-based method can be used by itself to monitor and control elution and fraction collection. For example, a small negative pressure or vacuum can be applied (at the proximal end of the capillary 106) at all times except when the distal end of the capillary 106 is disposed in a collection well. The contents of the capillary 106 can be monitored when the distal end if disposed in a collection well and a small positive pressure can be applied while monitoring mobilization of the contents of the capillary 106. The positive pressure can be ceased and/or switched with the small negative pressure, as soon as the desired analyte or analytes is collected in the collection well to prevent contamination by other unwanted contents of the capillary 106. The amount of positive and/or negative pressure, the duration and time of application, and the like can be chosen depending on parameters like dimensions of the capillary, material properties of the buffers, sample, etc. used, a degree of separation of analytes, a location of each separated analyte, an identity of a desired analyte or analytes to be collected as a fraction, and so on.

Each running buffer or chemical mobilizer in the collection wells, pressure, and/or an electric field to be applied when the distal end of the capillary 106 is disposed in each running buffer in the collection wells can be monitored while eluting to carefully control a rate of elution or volume of elution or a time of elution. The properties of the buffer or chemical mobilizer, the amount of pressure and time of application, and/or the magnitude and time of application of the voltage or electric field can be carefully selected to draw out only the most distal separated analyte or analytes defined by an desired point of separation located at a specified position along the length of the capillary 106. The running buffers and/or the applied electric fields can be used carefully draw the desired fraction of the separated analytes in the sample while not substantially drawing or disturbing the successive separated fractions of analyte or analytes that are not to be mixed with the collected fraction of analyte or analytes.

The sample plate assembly 107 and or the capillary 106 can be manipulated such that the distal end of the capillary 106 is disposed in a sequence of collection well in a sequential manner while eluting separated analytes in successive collection well of the sample plate. In some embodiments, the system 100 can be configured such that the sample plate assembly 107 can be automatically manipulated at a specified rate of introducing each successive collection well the rate being determined by a real-time analysis of the degree of separation of analytes. As another example, the sample plate assembly 107 can be manipulated to a sequence of collection well wherein the distal end of the capillary 106 can be disposed. A sequence of voltages or electric fields of a specified magnitude can be applied such that at each collection well the most distal set of analytes (e.g., analytes with the highest or lowest remaining pI, as is applicable in an implementation) desired to be isolated are collected upon applying the electric field. In some embodiments, as described previously, the sample plate assembly 107 can be automatically manipulated to introduce and/or position each successive collection well at a specified rate of movement to optimally isolate each separated analyte or set of analytes, the rate being determined by a real-time analysis of the degree of separation of analytes.

In some instances, a user can load a capillary cartridge 104 into the system 100 and can initiate and/or otherwise provide instructions to the system 100 to cause the system 100 to at least semi-automatically separate analytes within the sample by isoelectric point. In some instances, the system 100 draws a sample (e.g., including any suitable agent, reagent, protein, analyte, buffer, lysate, etc.) into a capillary, separates and/or focuses analytes in the sample within the capillary, and detects the presence or the absence of a target analyte and/or detects the location of analytes within the sample (e.g., analytes that have migrated to different positions along the capillary associated with their isoelectric points). The system 100 can then selectively elute at least some constituents of the sample within the capillary (e.g., one or more separated analytes) in a serial manner such that the separated analytes can be collected in collection wells and be used for further processing.

In use, for example, the system 100 can be set, programed, and/or otherwise placed in a configuration to perform fractionation of a sample, which can include, for example, preparing samples and/or reagents as well as preparing the cartridge 104. A user can then insert the cartridge 104 into the cartridge retainer 103 in a single, predetermined orientation, as described above. The cartridge retainer 103, in turn, at least temporarily couples to the cartridge 104 to retain the cartridge 104 in a substantially fixed (e.g., vertically oriented) position. The cartridge retainer 103 can couple to the cartridge 104 such that the proximal end of the capillary 106 is disposed in a first running buffer (e.g., acid of a desired acidic pH) held in a running buffer reservoir 105. The proximal portion of the contents of the lumen of the capillary 106 can be electrically and ionically coupled to the first running buffer via electrical contacts and/or fluidic connection. The sample plate assembly 107 is moved relative to the capillary 106 such that a distal end portion of the capillary 106 is disposed in a first vial or well containing a sample solution. A suitable driving force, for example, a vacuum source, is used to draw and load the sample into the capillary 106. The drawing and loading the sample can be accompanied by suitably operating one or more values that may be associated with loading the sample. For example, a valve in the distal end of the capillary 106 can be opened to allow the sample to be loaded while a valve in the proximal end can be closed to reduce movement of first running buffer into the capillary 106. The sample plate assembly may then be operated to remove the first vial or well and introduce a second well or vial that can include a second running buffer in which the distal end of the capillary 106 is disposed. The distal portion of the contents of the lumen of the capillary 106 can be electrically and ionically coupled to the second running buffer via electrical contacts and/or fluidic connection. The electronic system 108 can provide instructions to apply and/or apply an electric field between the first running buffer and the second running buffer via the contents of the lumen of the capillary 106. The applied electric field can induce separation of one or more analytes in the sample via isoelectric focusing. The analytes can be charge variants each associated with a different charge such that each separated analyte migrates and localizes at a point that corresponds to its isoelectric point (of neutralized charges) along the length of the capillary 106. The first running buffer and the second running buffer can be selected such that they define a pH range that encompasses the isoelectric points (pI) of the analytes or fractions that are desired to be separated and fractionated from the sample.

Following separation, the probe system 102 can be used to analyze the separated analytes using any suitable mechanism (e.g., fluorescence emission analysis, optical density analysis, etc.) The arrangement of the cartridge retainer 103 and the probe system 102 within the housing 101 is such that predetermined portions of the probe system 102 (e.g., an emitter and a detector) are aligned with predetermined portions of the cartridge retainer 103 (e.g., one or more openings or viewing windows or the like). Thus, by aligning the probe system 102 with the cartridge retainer 103 and with the cartridge retainer 103 retaining the cartridge 104 in a predetermined, fixed position, the emitter and the detector can be aligned with, for example, a portion of the capillary 106 of the cartridge 104. Therefore, energy and/or light emitted by the first emitter can be directed to a predetermined portion or length of the capillary 106. The detector can capture the signal emitted by the separated analytes and analyze the captured signal to determine a degree of separation, location of separation (e.g., relative location of peak quantity or a defined portion of a quantity) of a separated analyte along the length of the capillary 106, and/or an identity of the separated analyte(s).

In some instances, a full-column detection portion of a detector can detect "full-column" images or signals and/or otherwise can perform "full-column" detection of the sample within the capillary 106. Similarly stated, the detector can include an imaging device included in the probe system 102 can be operable to capture more than a single point along the capillary 106. For example, the imaging device can be operable to capture and/or detect a sufficient length of the capillary 106 to visualize separation and/or focusing of analytes during the separation and/or mobilization process (e.g., a length of about 1 cm, about 3 cm, about 5 cm, about 10 cm, about 20 cm, about 50 cm, or any other suitable length of the capillary 106). In addition, or alternatively, the imaging device can be operable to capture and/or detect native fluorescence, and absorbance of analytes within the capillary 106. For example, the probe system 102 can include a filter wheel associated with the detector and/or emitter such that the filter wheel can be rotated to change the optical signal presented to the sample and/or received from the sample while analytes are being separated, focused, and/or mobilized within the capillary 106. Thus, during a single run, a sample can be characterized for native fluorescence, absorbance, and/or any other suitable optical characteristic along the full-column while the analytes separate, focused, and/or are mobilized to be eluted in fractions.

The sample plate 107 can be operated, in conjunction with the analysis by the probe system 102 to dispose the distal end of the capillary 106 in successive collection wells including running buffers and/or chemical mobilizers that can be used to draw and elute a fraction of the separated analytes by applying a suitable driving force such as positive pressure by the vacuum source, or an applied electric field of a specified magnitude, and/or a chemical mobilizer with a desired pH. The sample plate 107 can be moved at a specified rate based on a real-time peak analysis (analysis of relative location of peaks of separated analytes), or an analysis of relative distribution of quantities of separated fractions of the analytes. The fractions once collected can then be used for any further downstream processing as desired.

Cartridge Including a Capillary with a Single Membrane

In some embodiments, a cartridge can be configured to include a single porous membrane. In some implementations, the cartridge can be compatible with systems configured for separation of analytes via isoelectric focusing of samples with the analytes (e.g., proteins) and other collection of charge variants (e.g., Maurice™ systems by Protein-Simple®) with a capillary fixed inside the cartridge. One end of the capillary, for example the proximal end, can include a small portion of a porous membrane tubing. The membrane tubing can be configured to be connected to a vacuum source, which can help draw a sample into the capillary through the distal open end of the capillary tube. The porous membrane can allow exchange of ions between the first running buffer in the running buffer reservoir (e.g., acid in an acid tank, which can be integrated or included in the cartridge), and the sample inside the capillary during the separation phase, via isoelectric focusing and during a chemical mobilization phase. A small portion of the distal open end of the capillary can protrude out of the cartridge cover. The protruding portion can be housed within a metal orifice tip, as described in further detail with reference to some embodiments disclosed below. Such a cartridge can be configured to implement the following steps. (1) A sample can be loaded into the capillary by application of vacuum or pressure when the metal orifice tip and the open distal end of the capillary is disposed or dipped in a well or vial containing samples. (2) A sample drawn inside the capillary lumen can be isoelectrically focused when a voltage is applied between the first running buffer in the running buffer reservoir (e.g., acid tank) and metal tip while the metal tip is disposed in a well or vial containing a second running buffer (e.g., base solution). (3) Separated charge variants can be mobilized out of the capillary into a collection well when a voltage is applied between the first running buffer reservoir (e.g., acid tank) and the metal tip while the metal tip is disposed in a well or vial containing a chemical mobilizer. The porous membrane can be designed and/or selected to efficiently balance the ion-exchanges between the first and second running buffers and/or the first running buffer and the chemical mobilizer. For example, the porous membrane can efficiently balance the ion-exchanges between the acid in the acid tank and the base solution in the vial. In some embodiments, the porous membrane can be selected to reduce or minimize any potential hydrodynamic flow during the isoelectric focusing stage (e.g., flow caused by gravity due to a vertical orientation of the capillary used for separation). In some embodiments, the membrane can be designed to enable effective mobilization speed and minimize the disruption of the pH gradient during the mobilization stage.

Fractionation System Using a Capillary Including a Single Segment

Figure 2:
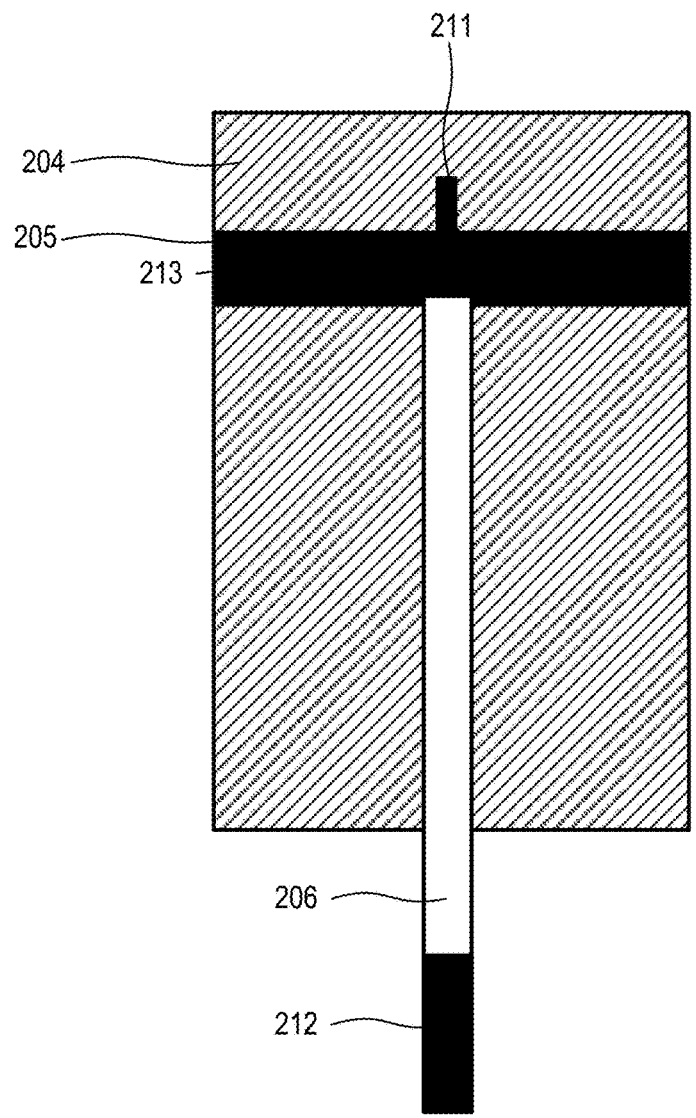
FIG. 2 is a schematic of a side view of an example capillary cartridge that can be used with a fractionation system, according to an embodiment.

In some embodiments, a fractionation system can use a capillary cartridge with a capillary with a single inner diameter as described previously with reference to the system 100. FIG. 2 is a schematic representation of a capillary cartridge 204, according to an embodiment. The cartridge 204 can be substantially similar in structure and/or function to the cartridge 104 described above and can be used by a fractionation system substantially similar to the system 100 described above.

The cartridge 204 includes a running buffer reservoir 205 and a capillary 206 disposed in the running buffer reservoir 205 such that the lumen of the capillary 206 at the proximal portion of the capillary 206 is configured to be in fluidic and ionic connection with the running buffer in the running buffer reservoir 205.

The running buffer reservoir 205 can be substantially similar in structure and/or function to the running buffer reservoir 105 described previously with reference to the system 100. The running buffer reservoir 205 can include a first running buffer of a first pH. For example, the running buffer reservoir 205 can include an acid of a specified acidic pH. The running buffer reservoir 205 can have any suitable volume. For example, it can have a volume of 500 µl to 4000 µl.

The capillary 206 can be substantially similar in structure and/or function to the capillary 106 described previously with reference to the system 100. The capillary 206 can be of any suitable length. For example, in some embodiments, the capillary 206 can have a length of 5 mm-1 m. In some embodiments, the capillary 206 can have a length of 50-120 mm. In some other embodiments, as described in further detail below, the capillary 206 can be longer at between 20 to 30 cm length. In some other embodiments, the capillary 206 can be even longer at ~1 m length. The capillary 206 can have any suitable inner diameter. In some embodiments, the capillary 206 can have an inner diameter of 320-530 µm. In some embodiments, the capillary 206 can be used to achieve high resolution of separation of larger samples and have an inner diameter of 200 to 500 µm.

The capillary 206 includes a porous membrane 213 disposed at the proximal end of the capillary 206 and configured to serve as a hydrodynamic barrier between the running buffer in the running buffer reservoir and the lumen of the capillary 206 at or near the proximal end of the capillary 206. In some embodiments, the cartridge 204 can include a tubing 211 (e.g., an additional length or segment of connecting capillary, a length of deformable polymer tubing (e.g., Tygon tubing), or a combination of such elements) that can be used to couple the porous membrane 213 and the distal end of the capillary 206 to an external vacuum source or pressure source. The external vacuum source or pressure source can be used to draw a sample into the capillary 206 as described previously with reference to the capillary 106 in the system 100 shown in FIG. 1. In some implementations, the tubing 211 can also be used to couple the lumen of the capillary 206 to a vacuum source and a waste reservoir (not shown in FIG. 2), for example the tubing 211 can be configured to be in fluidic connection to the vacuum source and a waste reservoir, such that contents of the capillary 206 and/or the porous membrane 213 can be drawn into the waste reservoir by providing suction using the vacuum source. The tubing 211 can include or run through one or more values (e.g., pinch valves) to control and/or route flow of fluid via the tubing 211 (e.g., into the waste reservoir).

In some embodiments, the porous membrane 213 can be disposed at a proximal end of the capillary 206 and the tubing 211 can be disposed at a proximal end of the porous membrane 213 such that the capillary 206, the porous membrane 213, and the tubing 211 can form a continuous lumen. In some embodiments, the porous membrane 213 can be disposed at a proximal end of a segment of the capillary 206 and there can be an additional segment of the capillary 206 (e.g., a segment of a connecting capillary) coupled to the porous membrane 213 which can in turn be coupled to the tubing 211. Said in another way, the porous membrane 213 can be disposed between two segments of the capillary 206, a segment for separation and a segment of connecting capillary, such that the more proximal segment of connecting capillary can be coupled to the tubing 211 instead of the porous membrane 213 being coupled to the tubing 211 directly. The additional segment of connecting capillary can permit more facile connection between the porous membrane 213 (which can be a porous membrane tubing) and the tubing 211. This configuration of using a connecting capillary to couple the porous membrane tubing 213 to the tubing 211 can take advantage of the fact that the porous membrane tubing is sized or selected such that it can seal and/or be glued to the capillary 206 (e.g., the inner diameter of the porous membrane 213 can be selected to form a tight seal with the outer diameter of the capillary 206 including the segment of connecting capillary and the segment of separation capillary). The tubing 211 (e.g., a soft silicone tubing) can be easily selected and used to push or clasp over the segment of connecting capillary and form a tight seal. The tubing 211 can be coupled to the vacuum source and/or the waste reservoir and a flow can be routed or controlled (e.g., using values) as described herein.

Fractionation System Using a Capillary Including a Single Segment of Larger Inner Diameter In some implementations, to maximize the sample loading capacity and at the same time maintain the advantage of real time monitoring of the isoelectric focusing progress (e.g., while using a system similar to the Maurice™ icIEF system), a capillary 206 with a large inner diameter (320-530 µm) with a given length (60-120 mm) can be used for the above-described single membrane cartridge. In some implementations, it can may be desirable to select the parameters of the capillary 206 (e.g., inner diameter, outer diameter, length, etc.) in consideration of and/or to match other parameters of the system, including a size of the running buffer reservoir 205 (e.g., acid tank) which can be from 500 ul to 4000 ul, a membrane with an MWCO from 10 kDa to 500 kDa, a volume associated with the membrane tubing 213 which can be 300 um ID to 700 um ID (with a length of membrane tubing between 0.5 mm to 2 mm). In some implementations, the capillary 206 can have an inner diameter and/or outer diameter such that the efficiency of isoelectric focusing can be maximized and/or the chemical mobilization current and the mobilization speed can meet a desired threshold value.

The porous membrane 213 can have a pore size defining a selectivity (i.e., MWCO) in allowing substances to flow or pass through. The MWCO of a porous membrane 213 can be any suitable size between 10 kDa to 500 kDa selected based on the implementation. In some instances, the porous membrane 213 can be selected based on or in conjunction with a selection of a volume associated with the running buffer reservoir 205. In some instances, the porous membrane 213 can be selected based on a dead volume associated with the tubing 211 included in the porous membrane 213 when the tubing 211 is coupled to the capillary 206. The dead volume can be a volume of solution that remains in the tubing 211 included in the porous membrane 213 after an operation (e.g., separation via isoelectric focusing, or mobilization and elution of fractions, etc.). In some instances, the porous membrane 213 can be selected based on an outer diameter and/or an inner diameter of the capillary 206. For example, the porous membrane 213, the running buffer reservoir 205, and/or the capillary 206 can be selected to match or complement each other for a specified implementation. As an example, a capillary with an inner diameter 300 um inner diameter to 700 um inner diameter can be matched with a porous membrane with a tubing 211 that has a length between 0.5 mm to 2 mm associated with a specified dead volume. Such a selection of the porous membrane 213, capillary 206, running buffer reservoir 205, and/or with the outer diameter and inner diameter of the capillary 206 can be implemented to achieve an increased or target efficiency of separation of analytes using isoelectric focusing and/or to achieve a desired chemical mobilization current/mobilization speed that is optimal for eluting desired fractions from the sample.

The capillary 206 includes a metal tip 212 disposed at the distal end of the capillary 206. The metal tip 212 includes an orifice that is aligned with the lumen of the capillary 206 and is configured to allow fluidic connection between the lumen of the capillary 206 at the distal end with the contents of a vial or well that the distal end of the capillary 206 may be disposed in as described previously.

During separation the analytes in the sample held in the lumen of the capillary 206 can be isolated or separated using isoelectric focusing by subjecting the sample to a first electrical field. The first electric field can be applied between the running buffer reservoir 205 holding a first running buffer (e.g., an acid) ionically coupled to the proximal end of the lumen of the capillary 206 and a second running buffer in a sample well or vial and ionically coupled to the distal end of the lumen of the capillary 206 via the metal tip 212 disposed in the second running buffer (e.g., a base). On application of the electric field current flows through the sample in the capillary 206 causing hydronium ions in the first running buffer (i.e. acid) held in the running buffer reservoir 205 start to migrate through the porous membrane 213 into the capillary 206 and towards the cathode at the distal end of the capillary 206, i.e. the portion of the capillary 206 comprising the metal tip 212 disposed in the second running buffer (the base), and hydroxide ions move towards the anode at the proximal end of the capillary 206, i.e. the portion of the capillary 206 disposed in the first running buffer (the acid) to establish a pH gradient. As the pH gradient is established, ampholytic analytes in the capillary will experience a force urging them to migrate towards a pH corresponding to their pI. Thus, the analytes with the lowest pIs will travel farthest towards the anode before they are neutralized by acquiring a zero-net charge. When analytes/ampholytes get neutralized in charge their movement ceases and they get focused at the point at which they are neutralized. Analytes with higher pIs neutralize nearer to the distal end of the capillary 206 (i.e., travels lesser than more acidic analytes/ampholytes).

Once separated, during chemical mobilization, the migrated peaks of analytes in the capillary 206 can be subjected to an influence of an applied electric field to elute fractions of the analytes for further processing as described previously. The electric field used during chemical mobilization can be applied between the running buffer reservoir 205 holding the first running buffer and the metal tip 212 which may be disposed inside a collection well or vial containing a chemical mobilizer.

A viewing window can be situated at any suitable location along the length of the capillary 206 and be of any suitable size (length and/or width) such that a probe system can be used to detect the presence and/or movement of separated analytes in the sample.

During the chemical mobilization phase, under the influence of voltage applied between the first running buffer for example, the acid in the acid tank, and the metal tip 212 which is disposed inside a collection well containing the chemical mobilizer, the negative ions of the mobilizer in the well can move into the lumen of the capillary 206 and towards the membrane side of the capillary 206 toward the acid tank 205, disrupting the pH gradient formed during the separation stage, causing analytes to migrate toward the cathode as they obtain a positive charge. Thus, in some instances, in practice, mobilization can cause a pH change, particularly at the distal end of the capillary 206, where ions from the chemical mobilizer move into the capillary 206. Thus, a change of the pH gradient during mobilization can be unavoidable.

The addition of the chemical mobilizer can cause the analytes with the highest pIs to be eluted from the capillary and collected in a collection well. The rate of change of pH gradient, if too fast, can be detrimental on the resolution of collected fractions. The rate of change can depend on the amount of ions moving into the capillary 206, the mobility of the ions, and/or the buffering capacity of the carrier ampholytes (see for example, Rodriguez-Diaz, R., Wehr, T., Zhu, M., Levi, V., Handbook of Capillary Electrophoresis (2nd Edition) 1997, 101-138, the entire contents of which are hereby incorporated by reference). The inventors of the instant application observed that the speed of peak mobilization can be controlled by the concentration of the chemical mobilizer as well as the voltage. For example, higher concentration and/or greater voltage lead to higher speed peak mobilization. In practice, the concentration of the mobilizer and/or the magnitude of mobilization voltage can be selected to achieve a desired speed of mobilization that can fall between 1 mm/min and 2 mm/min. With knowledge of the position (along the length of the capillary 206 and/or the pH gradient) of a peak of an analyte, the width of the peak, and the speed of peak mobilization, one can selectively collect a desired analyte associated with a peak into a single fraction or multiple fractions of desired purity by adjusting the time window of fraction collection.

In some implementations, a single mobilizer can be used whose pH is lower than the pI of all the analytes to be separated and eluted. The chemical mobilizer can titrate the pH gradient inside the capillary 206 gradually from the higher pI at the distal end toward lower pI at the proximal end. During such titration process, the peak with higher pI can become positively charged first and therefore be eluted out of the capillary 206 into the collection well first. In some implementations, the electric field and/or pH of the mobilizer can be kept constant. In some embodiments, the voltage and/or the pH of the chemical mobilizer can be changed at each elution of a fraction (e.g., elution associated with each collection well) as desired.

The steps followed during mobilization of fractions can be such that the focused or separated peaks of analytes can maintain their resolution of separation and/or relative separated position along the pH gradient during the migration and/or elution of fractions. In some instances, mobilization and/or elution may cause a change in the pH gradient, for example at the distal end of the capillary 206, where ions from a chemical mobilizer may move into the lumen of the capillary 206. In some such instances, a fast rate of change of pH gradient (e.g., above a specified threshold rate of change), may be detrimental to the resolution of separated analytes and/or collected fractions. The rate of change of the pH gradient can depend on the number of ions migrating from a chemical mobilizer and into the lumen of the capillary 206, a mobility of the ions, and a buffering capacity of a carrier ampholytes present in the sample in the capillary 206.

In some embodiments, a rate at which a peak quantity associated with a separated or isolated quantity of an analyte can be mobilized or migrated towards a collection well (also referred to as peak mobilization) can be modulated and/or controlled by a concentration of ions in the chemical mobilizer in the collection well used and/or the voltage applied to promote mobilization. For example, a higher negative ion concentration in the chemical mobilizer can lead to higher speed of peak mobilization. The ion concentration of chemical mobilizer can be between 1 mM to 200 mM. As another example, higher magnitude applied voltage (creating a higher electric field) can lead to higher speed of peak mobilization. The voltage can be between 500V to 2000V. The negative ion concentration of the chemical mobilizer and the magnitude of mobilization voltage can thus be selected to make the speed of mobilization of one or more analytes fall between 0.5 mm/min and 2 mm/min. The collection times (time to collect desired target fractions from a sample) can be between 30 s to 300 s. In some instances, a fractionation system (e.g., systems 100,200) can be used to determine a position of a peak associated with a quantity of a separated analyte, a width associated with the peak quantity of the separated analyte, and/or the speed of peak mobilization associated with one or more analytes. With this information, the fractionation system can be used to selectively elute and collect a desired peak into a single or multiple predefined fractions by adjusting the time window of fraction collection (e.g., coordinated with a rate of movement of a sample plate assembly as described previously).

Fractionation System Using a Capillary Including a Single Segment of Longer Length In some embodiments, using a capillary of smaller inner diameter and longer length can permit elution of purer fractions of individual peaks of analytes that have been separated. In some embodiments, a cartridge can include a capillary 206 with an inner diameter of 200-500 um and a total length of the separation capillary from 20-30 cm. In some embodiments, the initial sample focusing profile may be outside the viewing window of the detector so that a portion or all of the sample peaks may not be visible when the separation begins, depending on the pI and/or pI range of the analytes in the sample. The peaks of the desired analytes may, however, appear in the viewing window during sample mobilization and elution and the full sample focusing profile can be reconstructed later through image processing. In other words, an imaging system can act as a composite full-field and point detector when used with a cartridge with a long capillary. To speed up the sample mobilization and elution for such a cartridge, in some implementations, the system can be configured to introduce hydrodynamic mobilization in addition to chemical mobilization. To enable hydrodynamic mobilization, the cartridge 204 can include a large pore size membrane (MWCO from about 100 to 1000 kDa) between a proximal end of the capillary and the running buffer reservoir at or above the capillary (e.g., a top running buffer reservoir) and/or a particular location and/or orientation of the running buffer reservoir to encourage hydrodynamic mobilization as described herein. For example, in some embodiments, the porous membrane can have suitably large pore size and the running buffer reservoir can be located vertically above the proximal end of the capillary 206 such that the first running buffer in the running buffer reservoir (e.g., acid in the acid tank) can flow through the porous membrane and into the capillary 206 due to gravity. To manage and control the flow rate of the acid, a source of low vacuum can be connected to the acid tank which can oppose the gravitational force on the fluid in the capillary 206. During the initial sample focusing phase, the low vacuum can be increased so that there is no or minimal flow in the capillary 206. After the focusing is complete, the low vacuum can be reduced to allow acid flow into the capillary to initiate the hydrodynamic mobilization. In some implementations, the voltage can be applied concurrently with hydrodynamic mobilization to maintain separation resolution during mobilization of analytes. When the distal end of the capillary is disposed in a running buffer for separation (e.g., a base), then the applied electric field can result in maintenance of the pH gradient during the hydrodynamic mobilization. If the distal end of the capillary is disposed in a chemical mobilizer for mobilization/elution, then there will be a combination of hydrodynamic and chemical mobilization. By monitoring the sample peak migration in the viewing window, the system can be configured to calculate the hydrodynamic mobilization speed. Based on the speed of mobilization a time of arrival of individual peaks of interest in the sample at the distal end of the capillary end can be predicted so that the sample elution for that fraction of interest can be started. During sample elution, both hydrodynamic and chemical mobilization can act in concert when the elution buffer is also a chemical mobilizer.

Fractionation System Using a Capillary Including Multiple Segments

One of the performance parameters of a fractionation device is the resolution of the collected fractions achieved by the fractionation system. Resolution of collected fractions can be analyzed as follows. Consider two example analytes that when separated, for example using isoelectric focusing, can form two peaks of separated quantities (A and B) with neighboring pI values, such that $pI_A<pI_B$. The separated analytes can be eluted and collected in two consecutive collection wells (1 and 2). Separation resolution can be defined as the smallest pI difference, $\Delta pI=pI_B-pI_A$, for which the percentage of peak A in collection well 1 and the percentage of peak B in collection well 2 are both >85%.

Another important performance parameter of a fractionation system is the fraction recovery yield, which is the ratio of the collected amount or mass of a sample component to the amount or mass of the sample component that was loaded into the capillary. When using a fractionation system configured to use a capillary cartridge that includes a capillary with a fixed length, the amount of sample that can be loaded in a capillary with the larger inner diameter can be greater than the amount of sample that can be loaded in a capillary with a smaller inner diameter for the same length due to a reduction in volume.

As described above, using a capillary with a relatively large inner diameter allows a higher sample loading capacity compared to a capillary with a smaller inner diameter. A capillary with a larger inner diameter, however, may have a lower separation resolution as well as lower recovery yield. A capillary with smaller inner diameter can support higher separation resolution but may be limited in sample loading capacity unless capillaries of much larger length are used. To achieve both a higher sample loading capacity and higher separation resolution at a given length, some embodiments of a fractionation system can be configured to use a capillary cartridge including a capillary with two or more segments (i.e. a plurality of segments) each segment being associated with a specified length and a specified inner diameter.

Figure 3:
FIG. 3 is a schematic of a side view of an example capillary cartridge that can be used with a fractionation system, according to an embodiment.

FIG. 3 shows a schematic representation of a capillary cartridge 304 that includes a capillary with multiple segments, according to an embodiment. The capillary cartridge 304 can be substantially similar in structure and/or function to the cartridge 104 and/or the cartridge 204 described previously and can be used by a fractionation system substantially similar to the systems 100, 200 described above. The cartridge 304 includes a running buffer reservoir 305, a capillary 306, a porous membrane 313, a tubing 311, and a metal tip 312. Additionally, the capillary 306 includes three segments a first segment 306a, a second segment 306b, and a third segment 306c.

As described previously, the capillary 306 can include multiple (i.e., at least two) segments that each have a specified length and inner diameter. The capillary cartridge 304 including the capillary 306 combines the advantage of high sample loading capacity of a capillary with a segment 306a having a larger inner diameter, and the advantage of better resolution and fraction recovery yield of a capillary with a segment 306c having a smaller inner diameter, and includes a segment 306b that has a variable inner diameter that transitions from that of the segment 306a to that of segment 306c as illustrated in FIG. 3.

The segment 306a, or a first segment, of the capillary 306 is located towards the proximal end of the capillary 306 near the running buffer reservoir 305. The proximal end of the segment 306a is configured to include and/or be coupled to the porous membrane 313 and to be disposed in the running buffer reservoir 305 as described previously with reference to the capillary 106 and/or 206 in the systems 100 and/or 200 herein. The porous membrane 313 can be coupled, affixed (or the like) to a tubing 311 (e.g., soft silicone tubing), a length or segment of a connecting capillary followed by a length of tubing 311 (e.g., soft silicone tubing) which can then be coupled to an external pressure/vacuum source, and/or a waste reservoir. The tubing 311 can be coupled to an external pressure source or vacuum source as described previously with reference to the cartridge 104 and/or 204. The segment 306a can have a proximal end disposed in the running buffer reservoir 305 such that the lumen of the capillary 306 at the proximal portion of the segment 306a of the capillary 306 is configured to be in fluidic and ionic connection with the running buffer in the running buffer reservoir 305. The segment 306c can have a distal end coupled to the metal tip 312 and configured to be disposed in a running buffer of chemical mobilizer in a sample well or vial (e.g., operated by a sample plate assembly) such that the lumen of the capillary 306 at the distal portion of the segment 306c of the capillary 306 is configured to be in fluidic and ionic connection with the running buffer or chemical mobilizer in the sample well/vial or collection well/vial.

The segment 306a of the capillary 306 has an inner diameter larger than the segment 306b of the capillary 306 that is at the distal end and near the metal tip 312. In some embodiments, the inner diameter of the segment 306a can be any suitable value between 300 and 500 μm. The length of the segment 306a can be any suitable value between 20 cm to 60 cm.

The segment 306c, or a third segment, of the capillary 306 is located towards the distal end of the capillary 306 and is coupled to the metal tip 312 which can be dipped or disposed in a well or vial holding a running buffer and/or chemical mobilizer, to induce separation of analytes or mobilization of separated analytes, as described previously with reference to the cartridge 104 and/or 204. The segment 306c of the capillary 306 can have an inner diameter that is smaller than the segment 306a of the capillary 306 that is at the proximal end and disposed in the running buffer reservoir 305. In some embodiments, the inner diameter of the segment 306c can be any suitable value between 100 and 200 μm. The length of the segment 306a can be any suitable value between 20 cm to 60 cm. The length of the segment 306c can be any suitable value between 1 cm to 20 cm.

The segment 306b, or the second segment, of the capillary 306 is located between the segment 306a and the segment 306c and serves as a transition segment with its inner diameter being variable. The inner diameter of the segment 306b can be configured to change from a value close to the inner diameter of the segment 306a, at a portion proximal to the segment 306a, to a value close to the inner diameter of the segment 306c, at a portion proximal to the segment 306c. The length of the segment 306b can be any value determined to be suitable to provide a smooth transition from the segment 306a to the segment 306c and to gradually transition a migration of analytes from the segment 306a to the segment 306c. For example, in some embodiments, the segment 306b can have a length of approximately 5 to 10 mm.

In some embodiments, properties like the inner diameter, length, outer diameter, and/or thickness of the segments 306a, 306b, and/or 306c can be selected based on properties of each other and/or on the target separation and fractionation of analytes in a sample.

In some embodiments, some important considerations can include the following parameters. (1) Ratio of the inner diameter between the larger inner diameter segment and the smaller inner diameter segment. (2) Ratio of the length of the larger inner diameter segment and the smaller inner diameter section. In some embodiments the inner diameter of the segment 306a can be based on the inner diameter of the segment 306c. In some embodiments, the inner diameter of the segment 306a can be any suitable value approximately 2×-3× the inner diameter of the corresponding segment 306c. For example, in some embodiments the segment 306c can have an inner diameter of 150 μm and the segment 306a can have an inner diameter of 450 μm. In some embodiments, the length of the segment 306a (having a larger inner diameter) can be approximately 3-4 times the length of the segment 306c having the smaller inner diameter. In some embodiments, the ratio of inner diameters of segments 306a and 306c can be any number between 2 to 3. In some embodiments, the ratio of lengths of the segments 306a and 306c can be the reciprocal of the ratio of inner diameters of the segments 306a and 306c.

In some embodiments, two or more of the segments 306a, 306b, and/or 306c can be formed together as a single capillary tube with sections having variable inner diameter, length, and/or thickness. In some embodiments, the capillary 306 can be formed by joining, coupling, and/or attaching the various segments 306a, 306b, and/or 306c to generate the capillary 306. In some such embodiments, the coupling can be achieved using any suitable mechanism such that the coupling portion is sealed to flow of fluids and electric current, without any juncture being used (e.g., a membrane connection which may permit a flux of current to a separation of analytes within the capillary 306).

In some implementations, the capillary 306 can be configured such that the separation of analytes using isoelectric focusing of the charge variants takes place predominantly within the segment 306a with the larger inner diameter. The separated charge variants can be in the form of separated peaks of quantities of charge variants or analytes. The separated analytes can then be mobilized to migrate towards the distal end of the capillary 306 using any mobilizing mechanism as described previously. The separated peaks of analytes can be induced to migrate from the segment 306a via the transition in segment 306b and to the segment 306c having the smaller inner diameter. The segment 306b with the transition portion of the capillary 306b can be configured to help reduce or minimize any distortion of the separated peaks during the transition from the segment 306a with larger inner diameter and into the segment 306c having the smaller inner diameter.

In some implementations the separation using isoelectric focusing can be performed followed by chemical mobilization. In some implementations, separation using isoelectric focusing can be performed and continued through chemical and/or electrical mobilization such that the analytes are continued to be separated during mobilization.

A separation between two adjacent analytes or charge variants can be measured, for example using a probe system, by determining a distance between two adjacent peaks of separated analytes, as described previously. A distance between two neighboring peaks can increase as the separated analytes migrate from the segment 306a with a larger inner diameter into the segment 306c with the smaller inner diameter. For example, a peak width can increase with migration from a large diameter capillary segment to a smaller diameter capillary segment in proportion to a ratio of large inner diameter to the small inner diameter. The distribution of quantities of each separated charge variant and the peak of the distribution may widen as the separated analyte passes into the segment 306c with the smaller inner diameter. In the implementations where isoelectric focusing is continued to be carried out during mobilization, the distribution and the peak of each separated analyte is expected to re-sharpen during and after migration into the segment 306c due to a continuing effect of isoelectric focusing that occurs during the mobilization. The separation of analytes in the segment 306c can be used to guide migration of each analytes or faction to the distal end of the segment 306c and to elute the fraction by collecting into a collection well. The fractions collected by migrating the separated analytes to the distal end of the segment 306c and eluting the fractions can have as high a resolution as desired by modulating a real-time analysis of peak location/migration (e.g., using a probe system) and using the real-time analysis to guide movement of collection wells (e.g., using a sample plate assembly system). Such a high resolution can be achieved even for relatively larger samples when using a capillary 306 with multiple segments as described herein, due to the segment 306a with the larger diameter enabling loading of larger size samples, and the segment 306c having the smaller diameter enabling highly resolved separation and elution of fractions.

When two separated peaks adjacent to each other mobilize from the segment 306a with the larger inner diameter into the segment 306c with the smaller inner diameter the peak width, the distance between the two peaks, and the mobilization speed can increase. Experimental results indicated that the degrees of increase among these parameters are not proportional. Due to the non-proportional increase of peak width, distance between adjacent peaks, and/or mobilization speed, under the same elution time, a better purity of fraction could be obtained using a cartridge including a capillary with multiple segments each segment having a different inner diameter as shown in shown in FIGS. 17 and 18.

Figure 7A:
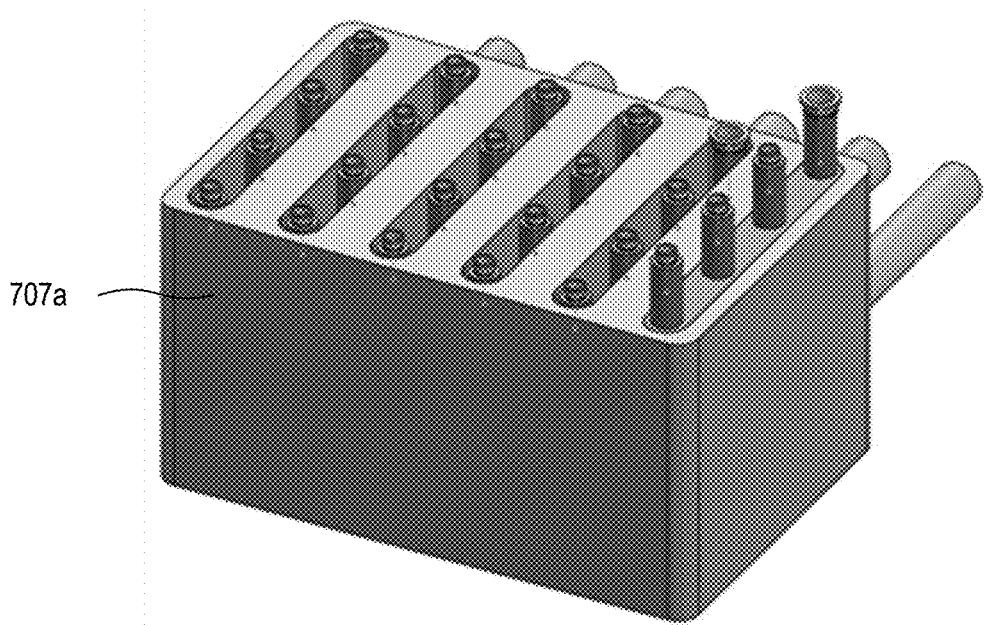
FIGS. 7A and 7B are perspective views of sample plate assemblies configured to be used with a fractionation system, according to two example embodiments.
Figure 7B:
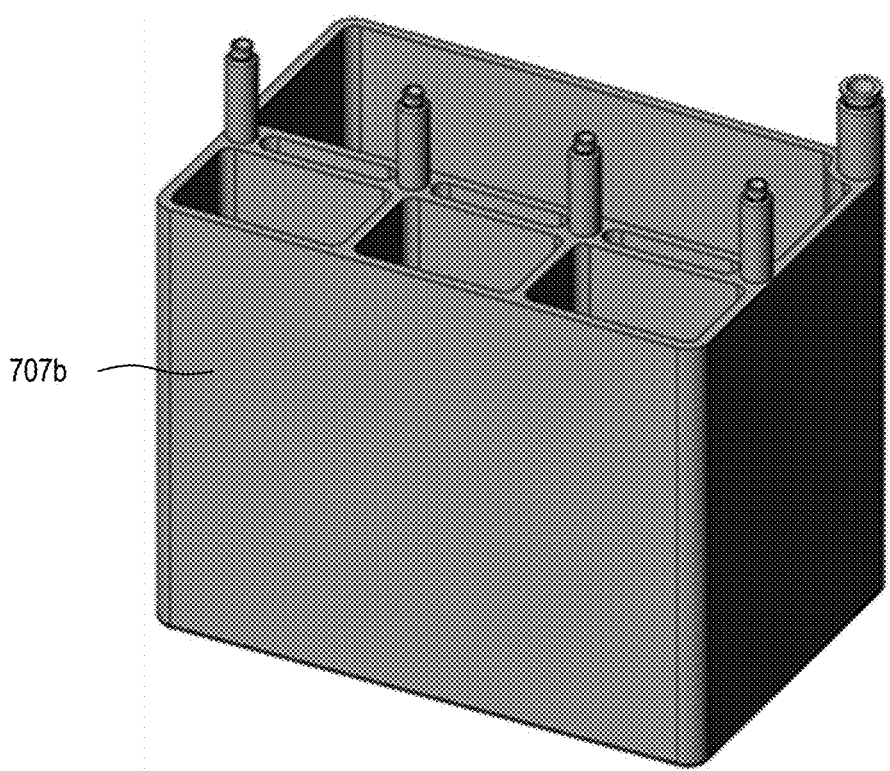

An additional benefit of using a capillary with multiple segments having varied inner diameter is that it allows the use of a longer elution segment (which comprises the smaller inner diameter segment). This allows the capillary to extend further from the body of the cartridge, as compared to the single segment capillary where a shortened capillary is preferred, which may benefit from the addition of a vial riser or vial lifter module in the sample plate as shown in FIGS. 7A and 7B, respectively to allow the capillary to reach the vials.

In some embodiments, full-capillary imaging can be used, so that the separation and mobilization can be monitored in real-time while the sample remains within the imaging window. Eventually, however, the separation will move out of the imaging window during mobilization and the last location and speed of a desired peak may have to be used to estimate the arrival of that peak at the distal tip of the elution segment of the capillary. As described herein, the electric field increases in the segment of the capillary that has the smaller inner diameter. The residence time of the sample (e.g., each peak associated with each analyte) inside the lumen of the smaller inner diameter segment of the capillary is reduced and the speed of elution of the analyte is increased proportional to the increase in the electric field. This increased speed of elution and reduced residence time results in the benefit that a longer section of smaller ID capillary can be used while maintaining the same time delay between a peak passing through the imaging region last used (e.g., to calculate arrival times of eluted analytes at the distal tip of the capillary) and the distal tip of the capillary, as for a shorter, single-segment capillary construction.

Cartridge

Figure 4:
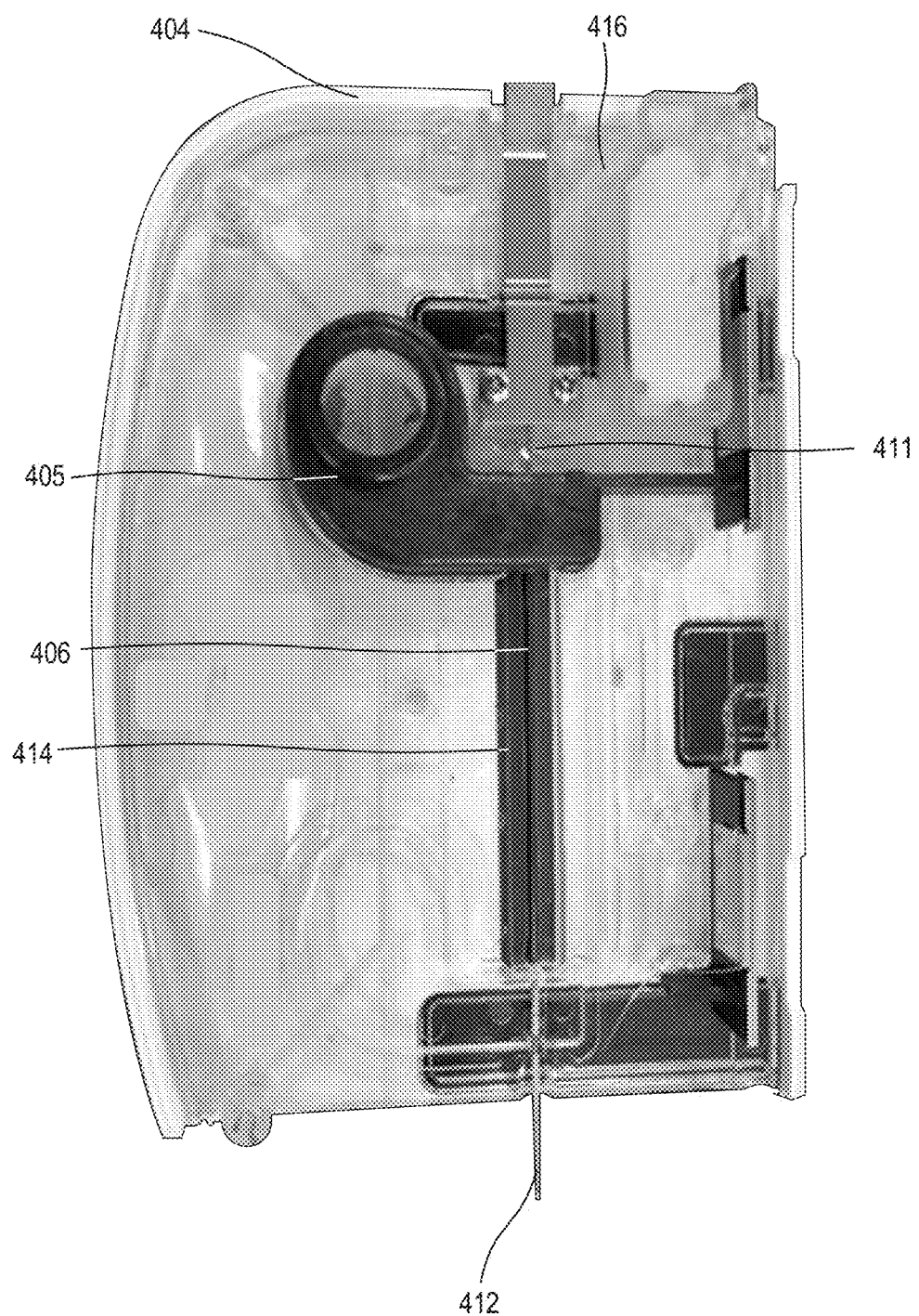
FIG. 4 is an image of a side view of a capillary cartridge that can be used with a fractionation system, according to an embodiment.

FIG. 4 is an image depicting an example cartridge 404 to be used with a fractionation system, according to an embodiment. The cartridge 404 can be substantially similar to the cartridge 104, 204, and/or 304 described herein. As shown in FIG. 4, the cartridge 404 includes a running buffer reservoir 405 and a capillary 406 configured to be disposed in the running buffer reservoir 405. The cartridge 404 includes a porous membrane disposed at a proximal end of the capillary 406 (not shown, hidden behind the running buffer reservoir 405) a connecting capillary 416 configured to be coupled to the capillary 406 via the porous membrane, and a metal tip 412 disposed at a distal end of the capillary 406. The connecting capillary 416 is coupled to a length of deformable polymer tubing 411 (connection point not visible) which is further coupled to an external vacuum source (not shown in FIG. 4). The cartridge 404 also includes a viewing window 414 configured to allow access to a portion of the capillary 406 such that contents (e.g., separated analytes) along the length of the capillary 406 can be probed to detect and analyze a presence and/or location of a desired analyte or fraction.

As shown in FIG. 4, the capillary 406 may have to extend sufficiently from the end or bottom edge of the cartridge 404 (e.g., extend for a length greater than 25 mm), such that it may be possible to dispose the distal end of the capillary 406 into a vial operated by a sample plate assembly of a fractionation system, to extract fractions directly to a standard microtiter plate.

In some embodiments, it may be desirable to minimize the length of the capillary extending beyond the viewing window to ensure accurate timing during sample elution and to maximize collection accuracy/efficiency. An example of such a cartridge 504 is illustrated in FIG. 5.

Figure 5:
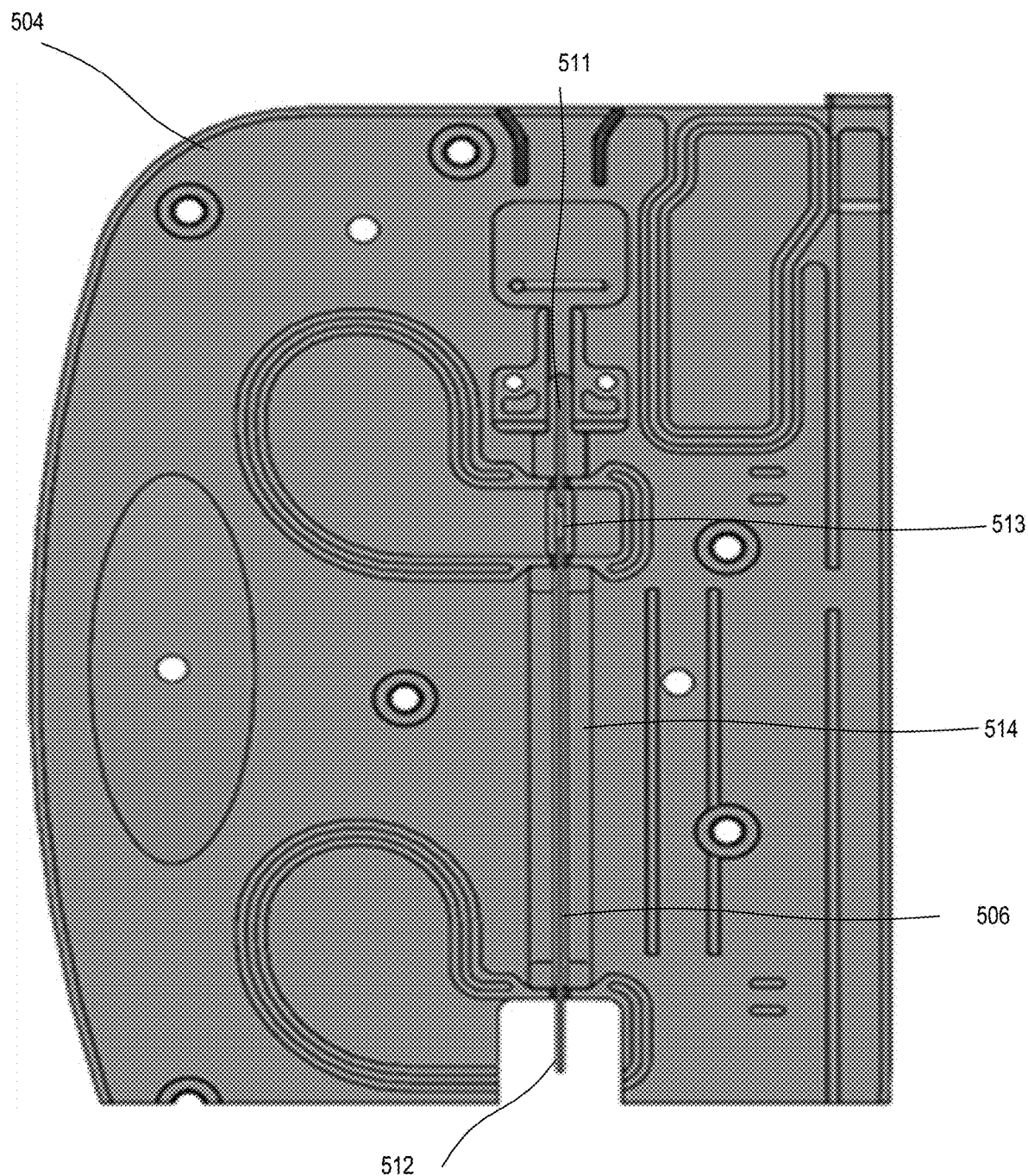
FIG. 5 is a schematic of a side view of a portion of an example capillary cartridge that can be used with a fractionation system, according to an embodiment.

FIG. 5 is a schematic illustration of a cartridge 504 that can be used with a fractionation system, according to an embodiment. The cartridge 504 can be substantially similar to the cartridge 104, 204, 304, and/or 404 in structure and/or function. The cartridge 504 includes a capillary 506. The capillary 506 can be substantially similar in structure and/or function to the capillaries 104, 204, 304, and/or 404 described herein. The cartridge 504 includes a porous membrane 513 that can be coupled to a proximal end of the capillary 506, a tubing or connecting capillary 511 that can be coupled to the capillary 506 via the porous membrane 513, and a metal tip 512 disposed at the distal end of the capillary 506. The porous membrane 513, tubing or connecting capillary 511, and the metal tip 512 can be substantially similar to the respective components described in detail with reference to cartridges 104, 204, 304, and/or 404. The capillary 506 can be situated in the cartridge 504 similar to the capillaries 106, 206, 306, and/or 406 with reference to cartridges 104, 204, 304, and/or 404, respectively. The distal end of the capillary 506 can be configured to extend past an edge of the cartridge 504 such that the distal end and at least a portion of the metal tip 512 can be dipped or disposed into a well or vial that can contain a running buffer or a chemical mobilizer as described herein. The cartridge 504 includes a viewing window 514 that permits access for a probe system (e.g., probe system 102 of system 100) to probe and/or detect a presence and/or location of analytes or desired contents in the lumen of the capillary 506. As described previously, the viewing window can be of any suitable size or shape and can be positioned at any desired location or orientation such that a desired portion or portions of the capillary can be accessed to be probed.

Example Fractionation System

Figure 6:
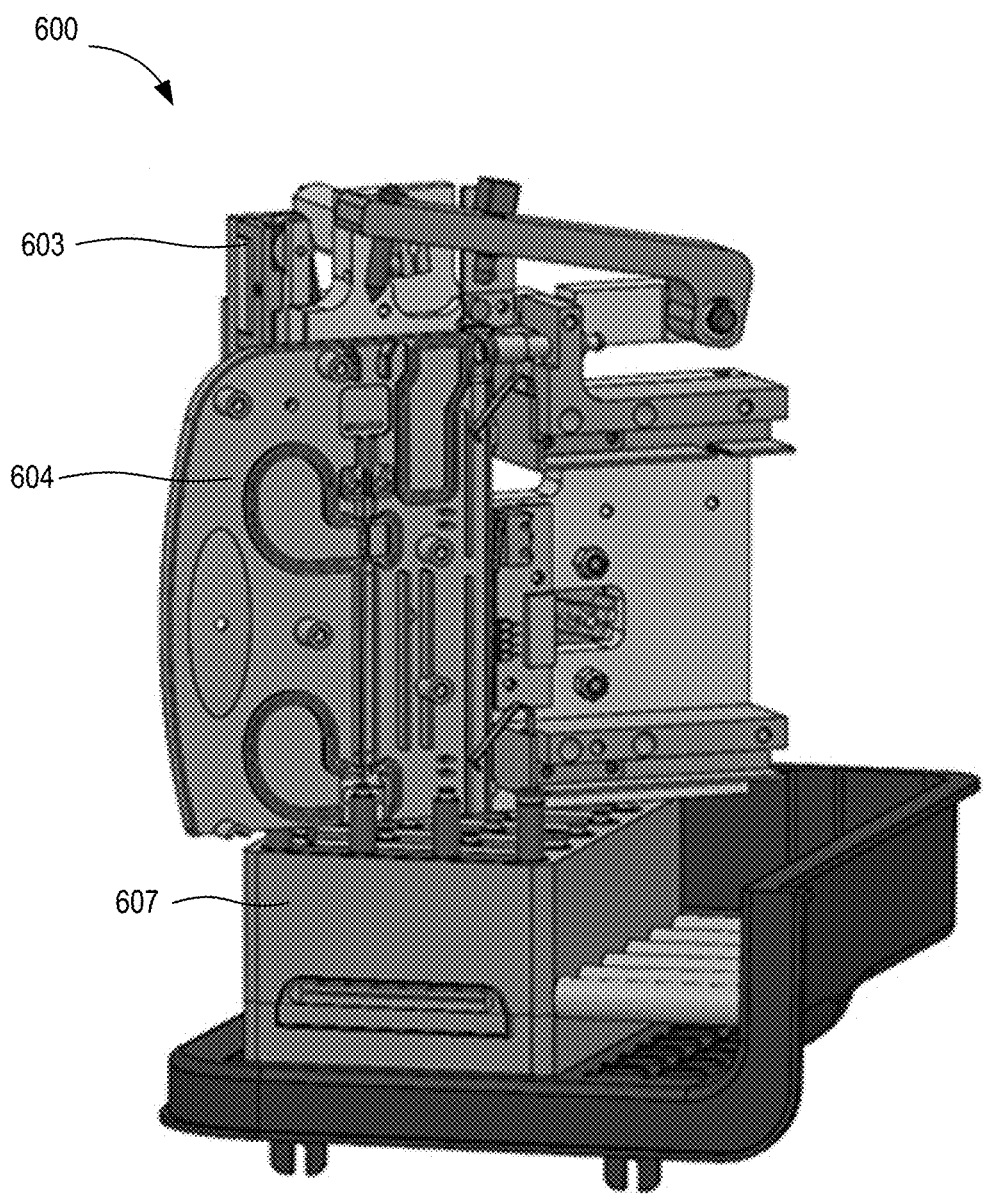
FIG. 6 is a perspective view of a fractionation system, according to an embodiment.

FIG. 6 is a schematic representation of an example fractionation system 600 to separate and elute desired fractions of a sample, according to an embodiment. The system 600 can be substantially similar in structure and/or function to the system 100. The system 600 includes a cartridge retainer 603 that is configured to retain and use a capillary cartridge 604. The cartridge 604 can be substantially similar in structure and/or function to any of the cartridges 104, 204, 304, 404, and/or 504 described herein. The system 600 can be configured to be used with any of the cartridges 104, 204, 304, 404, and/or 504. The system 600 includes a sample plate assembly 607 that can be substantially similar to the sample plate assembly 107.

The sample plate assembly 607 can be operated to bring one or more sample wells/vials or collection wells/vials such that he distal end of a capillary in the cartridge can be disposed suitably in the wells/vials. The sample plate assembly 607 can be operated using any suitable mechanism. In some embodiments, the sample plate assembly can be operated to move wells or vials can be moved in a lateral, longitudinal, and/or vertical direction. For example, in some embodiments, vials or well can be operated such that individual wells or vials can be advanced in a forward, and backward motion, positioned with a sideward motion, and raised and/or lowered in a vertical motion.

Sample Plate Assembly Configurations

The ability to raise individual vials up into a recess defined in a cartridge to allow access to a distal end of the capillary enables the capillary extension length to be just longer than the depth of fluid that must be addressed while avoiding interference with adjacent wells as would be case if using a microwell plate with such a short capillary. FIGS. 7A and 7B illustrate two example sample plate assemblies 707a and 707b, according to two embodiments. While the process of disposing capillary in a vial or well is described here by a method of moving the vial or well, in some embodiments, this can be achieved, just as well, by moving the capillary. For example, the cartridge and the capillary can be mounted on a movable arm that can be actuated to raise and lower the distal end of the capillary to a desired extent into a vial or well.

In the embodiments represented by the sample plate assembly 707a, as depicted in FIG. 7A, the system can include an actuated vial lifter module that allows collecting samples into more than just a few widely spaced, non-interfering, fixed height vials, and keeps the system compact. In some implementations, it may be desirable that a user be able to quickly reconfigure an instrument for fraction collection from another mode of operation. This can be accomplished with the drop-in vial lifter module shown in FIG. 7A that is configured to automatically raise vials up to the capillary during the fractionation process. The vial lifter module can be actuated using any suitable mechanism (e.g., rotary switch mechanism). In some embodiments, for example vial holders can be raised and lowered by rotary actuated cams. One or more of the vial locations may contain other reagents (e.g., running buffers, chemical mobilizers, standards, cleaning buffers, etc.) necessary for fraction collection or cartridge cleanup and either positive or negative pressure may be applied to cause fluid flow. In some embodiments. the sample plate assembly (or module) can be removable and insertable into a fractionation system as and when needed. Power, communication, and temperature control can be coordinated from the fractionation system (e.g., via an electronic system) when the sample plate system has been inserted into a fractionation system. Upon completion of the fractionation process, the user can remove the sample plate assembly to restore previous functionality.

Alternately, as shown in FIG. 7B, in some embodiments, a fixed height, vial holder, with capacity limited due to interferences, could be used to collect a few samples. The cartridge holder assembly (FIGS. 7A and 7B) can be designed such that it does not interfere with any raised vials yet will provide the functionality required for other modes of instrument operation. For example, a presser foot, pipet and a manual latch release can fully retract or be removed during fraction collection.

In some embodiments, the cartridge retainer of a fractionation system may be reconfigured such that a cartridge retainer does not interfere with any raised vials yet will provide the functionality required for other modes of instrument operation. For example, in some cases, a presser foot, pipet and/or manual latch release can be fully retracted or be removed during fraction collection operation.

FIG. 8 is a flowchart showing an example method 800 of separation and elution of fractions from a sample, according to an implementation. The method 800 can be implemented by any fractionation system described above including systems 100, 600, and/or by using any capillary cartridge described above including cartridges 104, 204, 304, 404, 504, and/or 604.

At 871, the method 800 includes introducing, at a first time, a sample containing a plurality of analytes in a conductive medium into a capillary, ionically coupling a first end of the capillary to a first running buffer having a first pH. The first end of the capillary can be a proximal end of the capillary. In some instances, the running buffer can be an acid held in a running buffer reservoir, as described herein. In some instances, the proximal end of the capillary can be disposed in the running buffer via porous membrane and coupled to a pressure source as described herein.

At 872 the method 800 includes ionically coupling a second end of the capillary to a second running buffer having a second pH, such that a pH gradient forms along the capillary. In some instances, the second running buffer can be a base held in a sample vial or well operated by a sample plate assembly. The second end or distal end can be disposed in a well holding the second running buffer or base.

At 873 the method includes separating, at a second time after the first time, at least a subset of the plurality analytes according to their isoelectric points by applying a voltage across the first running buffer and the second running buffer when the first end of the capillary is ionically coupled to the first running buffer and the second end of the capillary is ionically coupled to the second running buffer. In some instances, the voltage can be applied via electrical contact points at the proximal end and the distal end of the capillary as described herein. In some instances, the contents of the capillary can be analyzed using any suitable method of detection and/or visualization as described herein, during and/or after the separation of analytes.

At 874, the method includes placing the second end of the capillary into a well including a chemical mobilizer at a third time after the first time to elute an analyte from the plurality of analytes from the capillary and into the well. In some instances, the second end or distal end of the capillary can be removed from being disposed in the second running buffer for separation and placed or disposed in a well containing a chemical mobilizer. The chemical mobilizer can have a pH less than or equal to a pI of a fraction of the sample targeted for elution.

At 875, the method includes applying a second voltage across the first running buffer and the chemical mobilizer at the third time and when the first end of the capillary is ionically coupled to the first running buffer and the second end of the capillary is disposed in the well, the second voltage and the chemical mobilizer collectively causing the analyte to be eluted. The applied second voltage can be configured to elute fractions up to the desired pI. The elution of fractions using a second applied voltage can implement an electrical mobilization. The second voltage can be the same as, or different from the first voltage.

At 876, the method 800 optionally includes increasing, at a fourth time after the third time, a pressure at the first end of the capillary such that the pressure induces hydrodynamic flow in the capillary, eluting the analyte. The elution of fractions using an applied pressure differential (e.g., positive pressure) to migrate fractions can implement a hydrodynamic mobilization.

In some implementations, elution can be achieved using pressure-based mobilization, chemical mobilization, or electrical mobilization, or hydrodynamic mobilization, or any combination thereof. Optionally the method can include monitoring during mobilization such that, for example, the process of mobilization can be ceased or slowed down after a target peak of a desired analyte or fraction has been eluted.

Figure 9A:
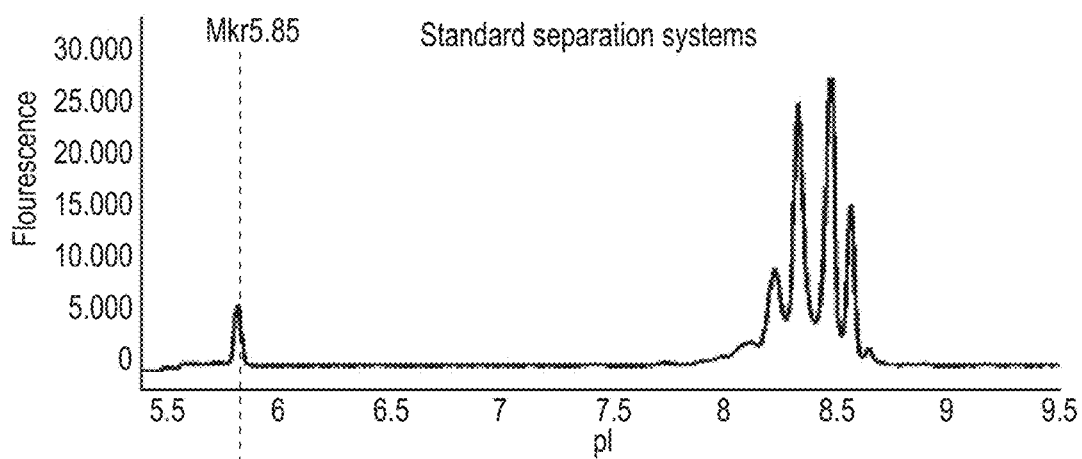
FIGS. 9A, 9B, and 9C are plots of experimental data indicating separation of an analyte using a standard separation system, a fractionation system with a single segment capillary, and a fractionation system using a multi-segment capillary, respectively.
Figure 9B:
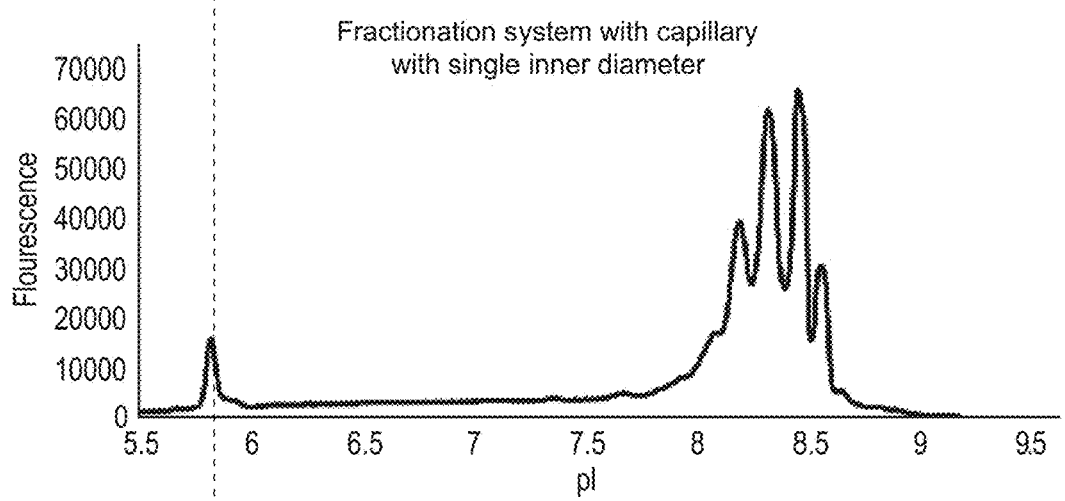
Figure 9C:
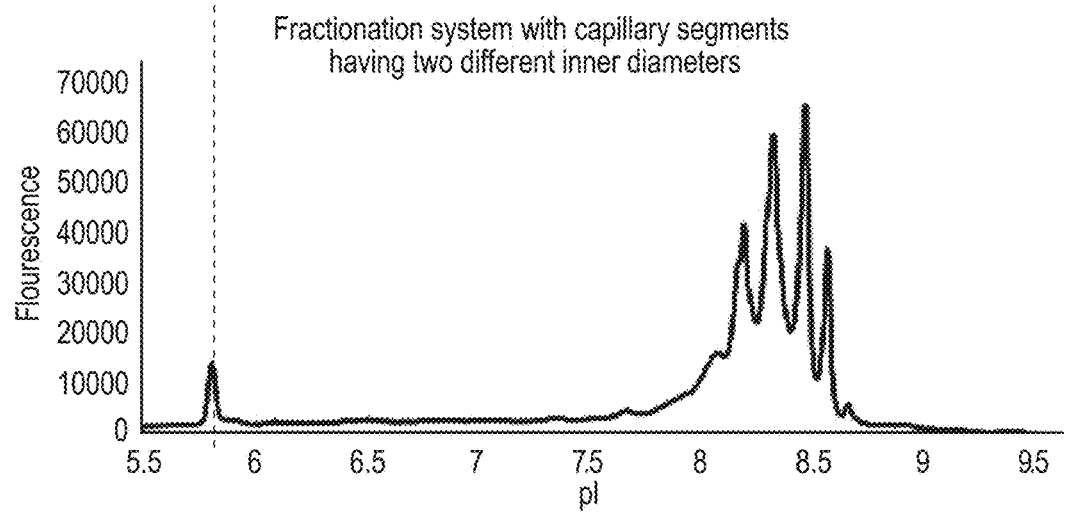

FIGS. 9A, 9B, and 9C provides example plots showing results from separation and isoelectric focusing of a sample containing HER2-Trastuzumab. The plots indicate results obtained using a standard separation system (FIG. 9A) that may use a standard cartridge, using a fractionation system with a cartridge having a single segment capillary (FIG. 9B), and using a fractionation system with a cartridge having a multi segment capillary (with two or more segments having varied inner diameters). The capillary used for FIG. 9B had a single inner diameter that was approximately 320 μm. The capillary used for FIG. 9C had at least one segment (e.g., proximal segment sued for separation) with inner diameter 300 μm and one segment (e.g., distal segment used for elution) with inner diameter of 150 μm. The quality of focusing in FIGS. 9B and 9C are shown to be comparable with that by a standard separation system in FIG. 9A.

Figure 10:
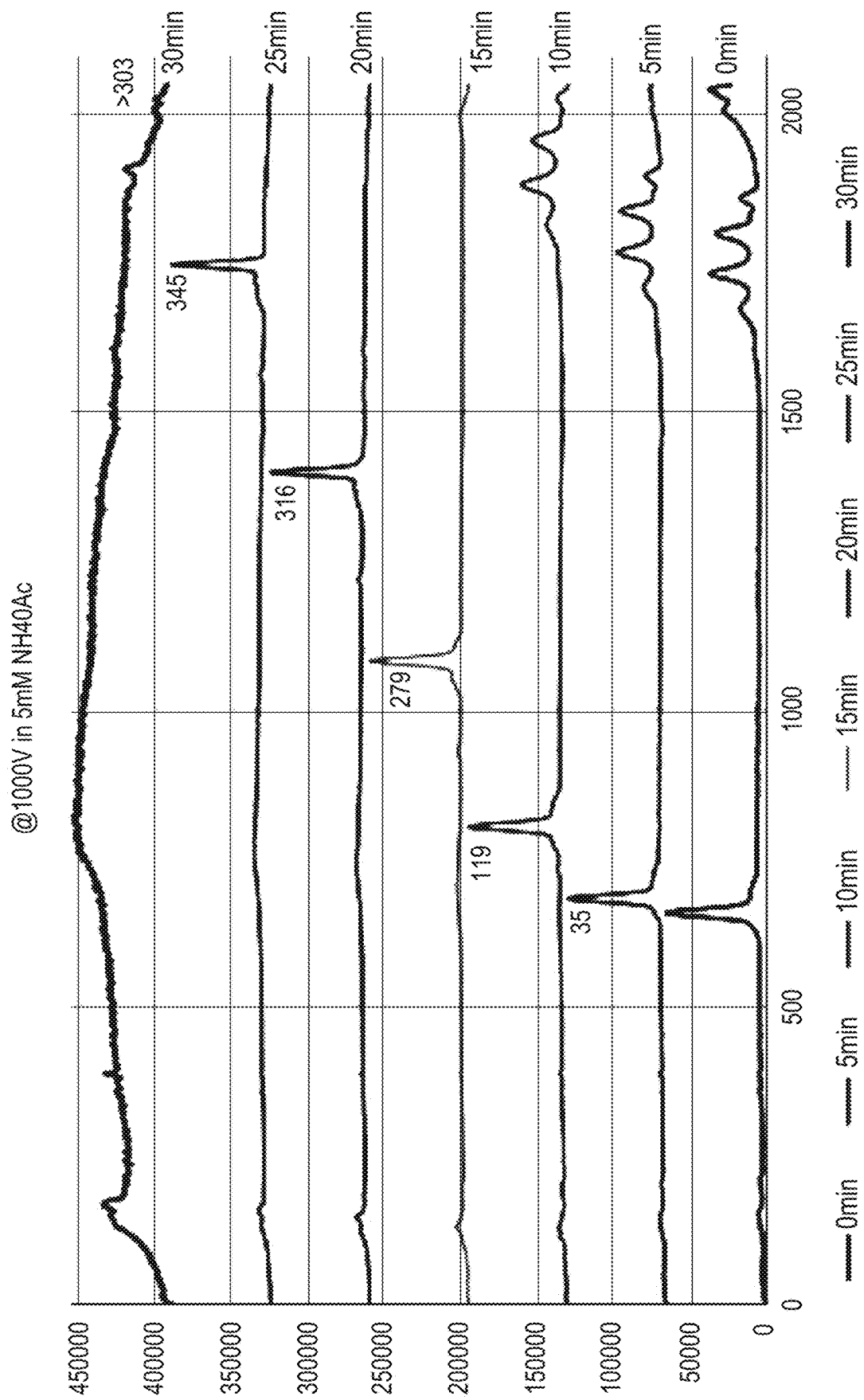
FIG. 10 depicts experimental data indicating a mobilization of an analyte using a fractionation system.

FIG. 10 is a plot showing chemical mobilization of HER2-Trastuzumab using a fractionation system, according to an embodiment. In the example implementation shown in FIG. 10, a cartridge with a capillary having a single segment with inner diameter of approximately 320 μm was used. Each trace from the set of seven traces corresponds to detection and analysis of the analyte, HER2-Trastuzumab, performed, starting at 0 minutes (bottom) and at increasing 5 min intervals for 30 minutes (top). The numbers above each trace represents the mobilization speeds measured in terms of detector pixels traversed by the pI marker associated with HER2-Trastuzumab at each 5 min interval. The mobilization speed increases gradually during the initial mobilization phase and stabilizes after around 15 min under the specific test conditions described above.

Figure 11:
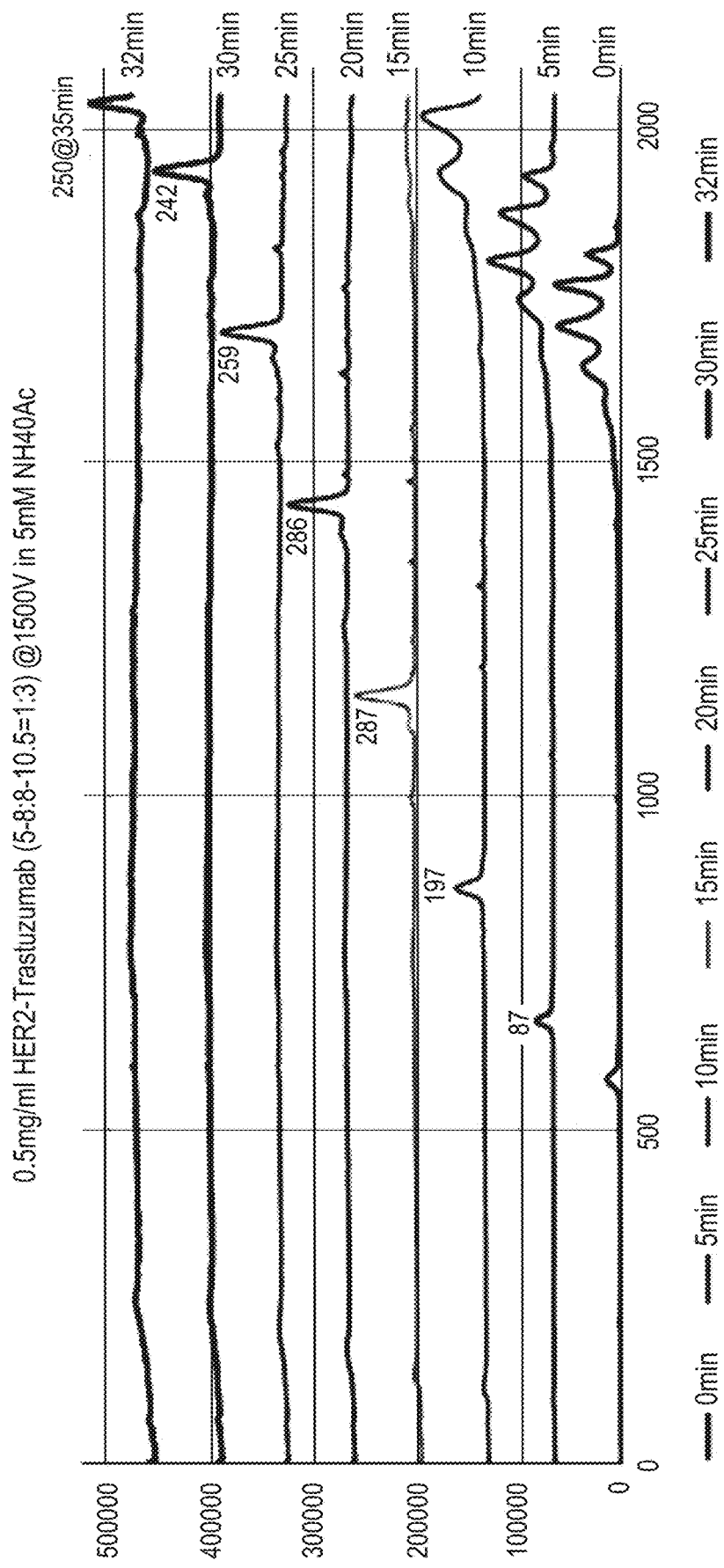
FIG. 11 depicts experimental data indicating a mobilization of an analyte using a fractionation system.

FIG. 11 is a plot showing chemical mobilization of HER2-Trastuzumab using a fractionation system, according to an embodiment. In the example implementation shown in FIG. 11, a cartridge with a capillary having multiple segments was used. The capillary included a segment with a large inner diameter portion or segment with inner diameter of 300 μm and small inner diameter portion or segment with inner diameter of 150 μm. The numbers in the figure are mobilization speeds measured in terms of detector pixels traversed by the pI marker every 5 min, starting at 0 minutes (bottom) and ending at 32 minutes (top). The mobilization speed increases gradually during the initial mobilization phase and stabilizes after around 15 min under the specific test conditions described above and in FIG. 11.

Figure 12:
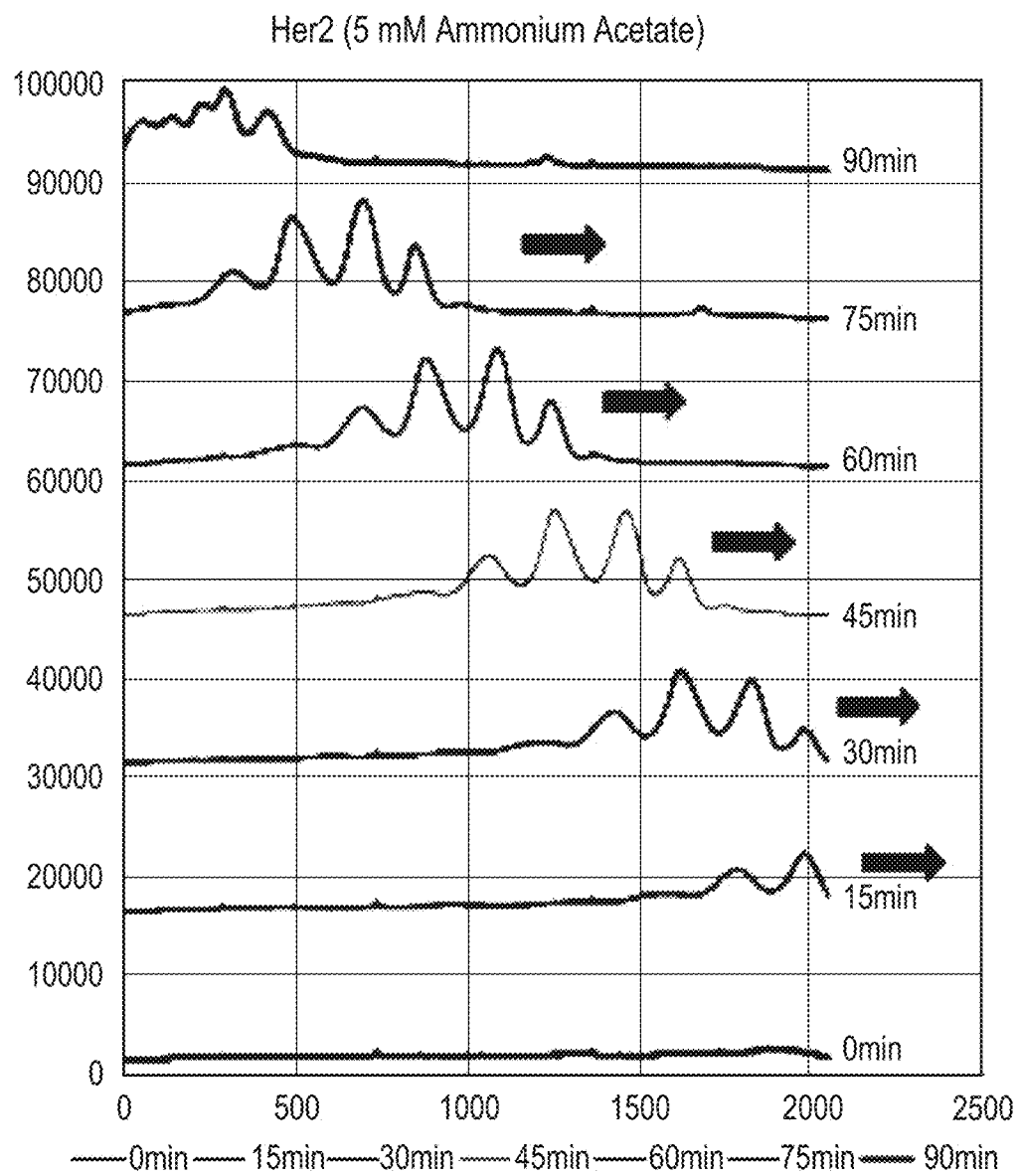
FIG. 12 depicts experimental data indicating a separation and mobilization of analytes using a fractionation system.

FIG. 12 provides a plot of traces showing an example of focusing and hydrodynamic mobilization of HER2-trastuzumab using a cartridge with a single segment long length capillary, according to an embodiment. The arrow points in the direction of mobilization. The peak resolution is well-maintained during the hydrodynamic mobilization process as the separated set of peaks migrates towards the distal end of the capillary.

Figure 13:
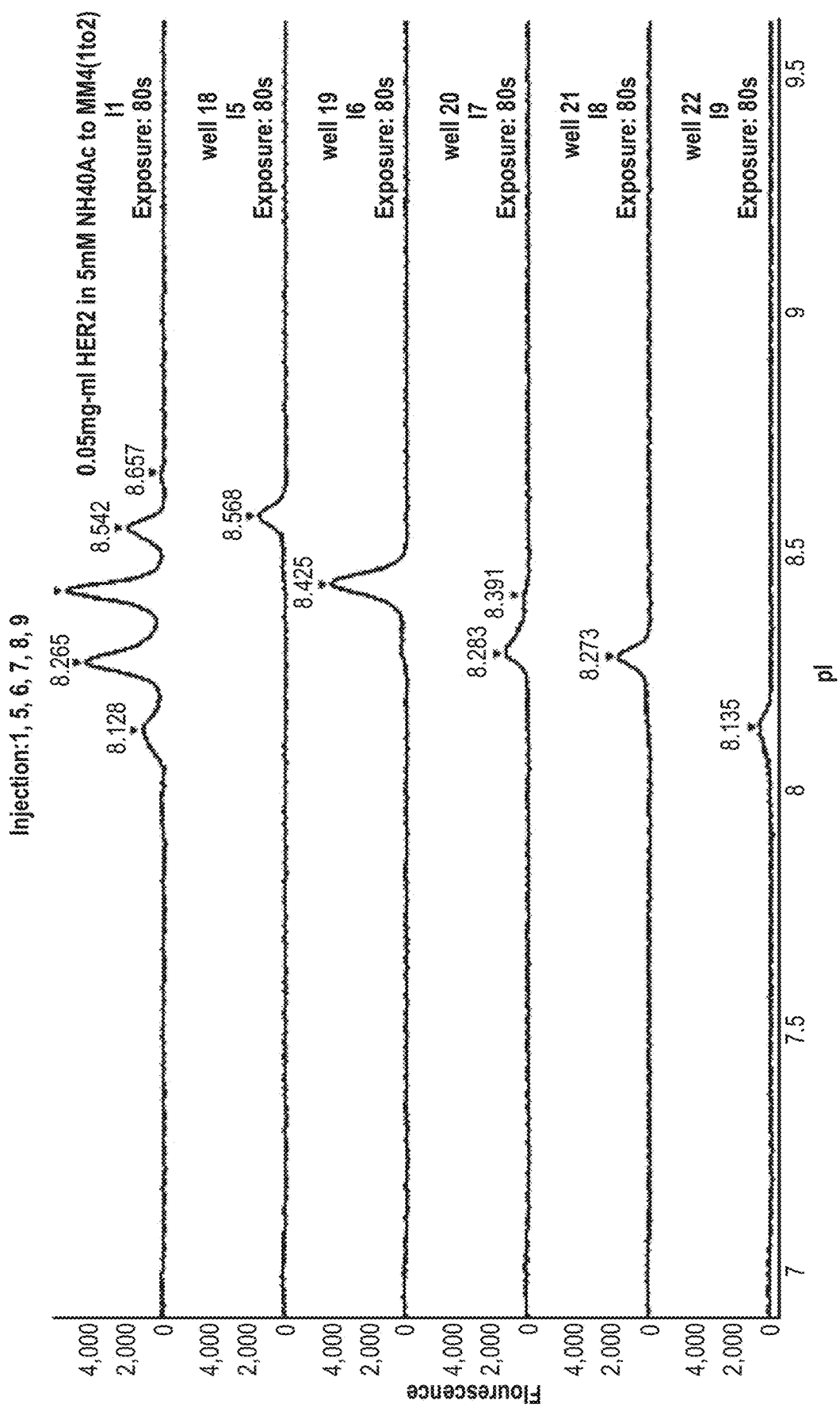
FIG. 13 depicts experimental data indicating fractions of a sample mixture collected using a fractionation system.

FIG. 13 provides a plot of traces showing an example of separated fractions of HER2-Trastuzumab collected from a cartridge with a single segment with a large inner diameter (320 μm), according to an embodiment. The unfractionated HER2-Trastuzmab was used as a reference sample (top trace in FIG. 13) to identify and match peaks. The reference sample and the collected fractions were evaluated using the Maurice icIEF method to confirm the pI for each individual fraction. The HER2-Trastuzmab has 4 main charge variants with approximate pIs 8.5, 8.4, 8.3, and 8.2, respectively. The majority of the pI 8.5 charge variant was collected into well 18 (second trace from the top), the majority of the pI 8.4 charge variant was collected into well 19 (third trace from the top), the majority of the pI 8.3 charge variant was collected into well 20 and well 21 (fourth and fifth traces from the top), and the majority of the pI 8.2 charge variant was collected into well 22 (most bottom trace). In an alternative experiment, the majority of the pI 8.3 charge variant may have been just as well collected in a single well by adjusting the collection time and/or the speed migration and elution, as described herein.

Figure 14:
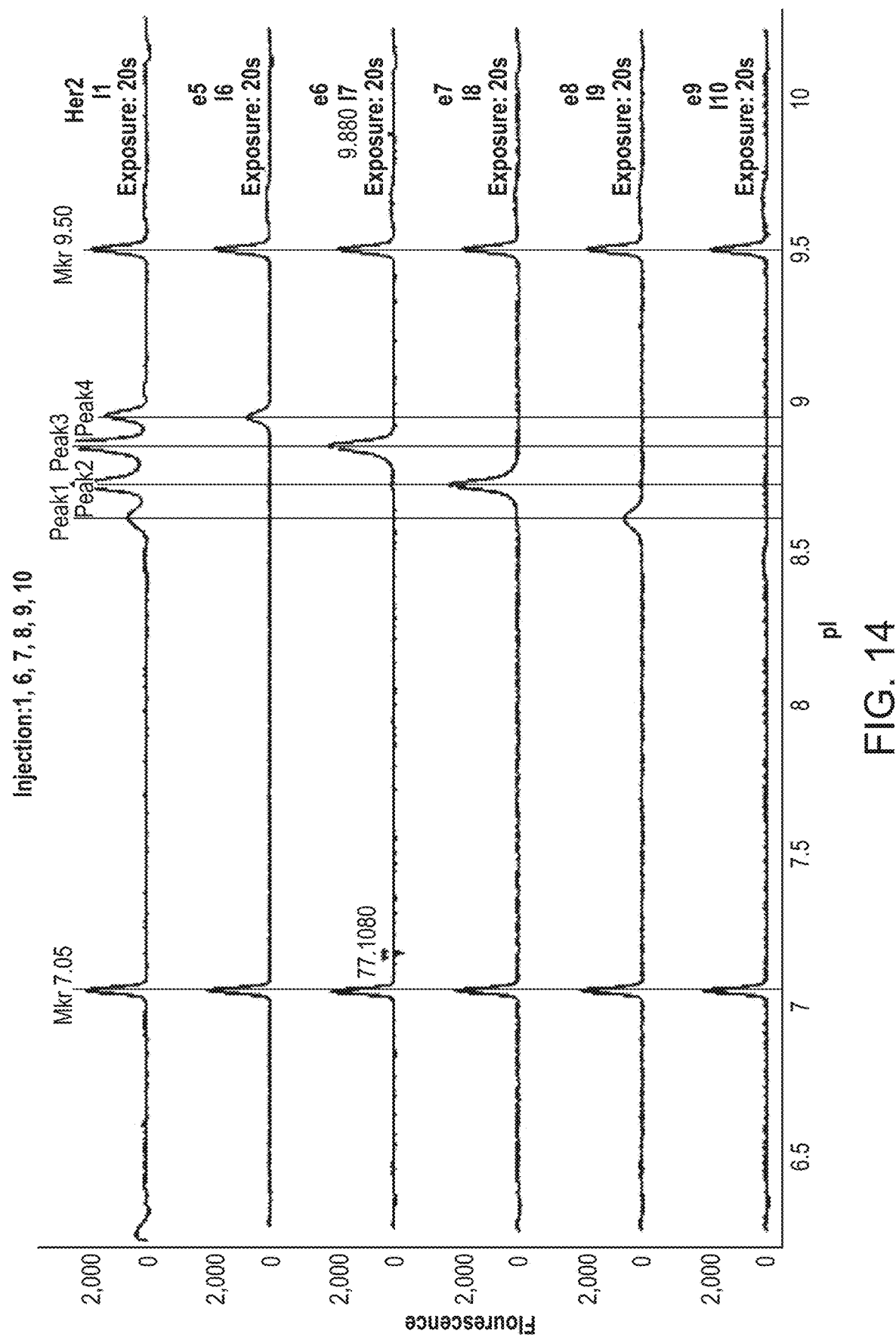
FIG. 14 depicts experimental data indicating fractions of a sample mixture collected using a fractionation system.

FIG. 14 provides a plot of traces showing an example of fractions of HER2-Trastuzumab collected from a cartridge having a long capillary with a single segment. The unfractionated HER2-Trastuzmab was used as a reference sample (top trace in FIG. 14). The reference sample and the collected fractions were evaluated using the Maurice icIEF method to confirm the pI for each individual fraction. The HER2-Trastuzmab has 4 main charge variants represented by peaks 1-4 in FIG. 14. The majority of peaks 4, 3, 2, and 1 were collected into wells 5, 6, 7, and 8, respectively, as shown by traces two to six from the top in FIG. 14. As aforementioned, by adjusting the time window of fraction collection based on the observed peak mobilization speed, a fractionation system can be used to selectively collect a single peak into a single fraction or multiple fractions.

Experimental tests were conducted to study icIEF fractionation followed by ZipChip-based mass spectrometry characterization of NIST mAb and XMT-1535 mAb. Individual charge variants of each antibody were successfully collected in less than 2 hours with purity >80% using icIEF separation conditions with or without urea. Rapid analysis using ZipChip showed the mass spec identification of major and minor isoforms correlated well with reported mass spec data (literature and report). Urea in icIEF separation did not affect the quality of fractionation nor the mass spec result. Multiple fractionation runs of the NIST mAb suggested good reproducibility of the system.

Figure 15:
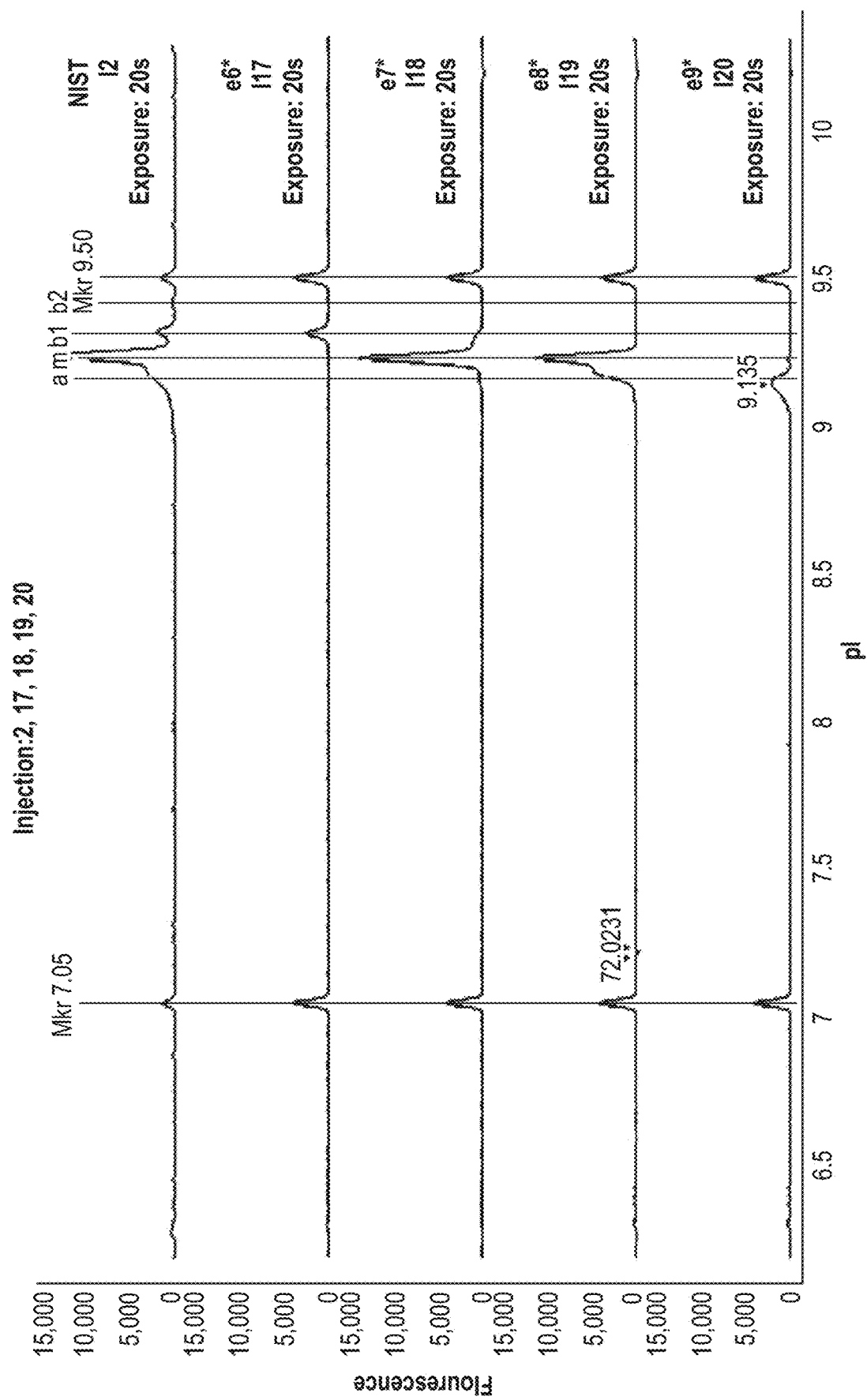
FIG. 15 depicts experimental data indicating fractions of a sample mixture collected using a fractionation system.

FIG. 15 provides a plot of traces showing an example of fractions of a NIST mAb collected from using cartridge with a long capillary having a single segment. The unfractionated NIST mAb was used as reference sample the results of which is shown in the top-most trace. The reference sample and the collected fractions were evaluated using the Maurice icIEF method to confirm the pI for each individual fraction. The NIST mAb shows 2 basic charge variants (labeled as b1 and b2 in FIG. 15), a main charge variant (labeled as M, tallest peak), and an acidic charge variant (labeled as a). Well 6 collected the majority of b1 (second trace from the top), well 7 collected a significant portion of M (third trace from the top), well 8 collected the remaining portion of M as well as a small portion of a (fourth trace from the top), and well 9 collected the remaining portion of a (bottom most trace).

Figure 16:
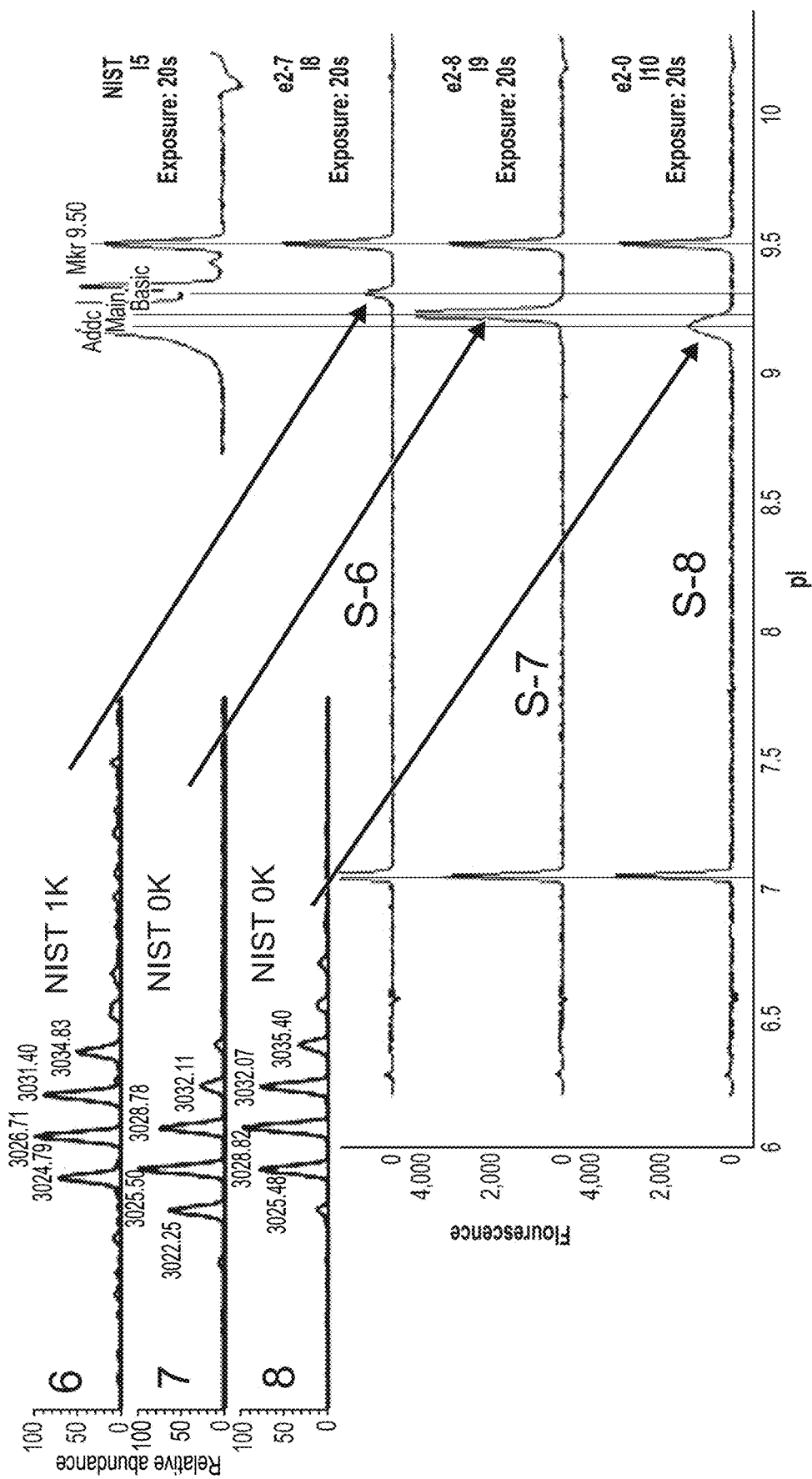
FIG. 16 depicts experimental data of mass spectra obtained from fractions of a sample mixture collected using a fractionation system.

FIG. 16 provides plot of traces showing an example of the mass spectra obtained from fractions of the NIST mAb collected from using a cartridge with a long capillary having a single segment. Fractions 6, 7 and 8, indicated in traces labeled S-6, S-7, and S-8, were successfully characterized by mass spectrometry. The results from mass spectrometry of each of the fractions 6, 7, and 8 is shown in the insert with each mass spectra associated with each fraction being indicated by arrows.

Figure 17:
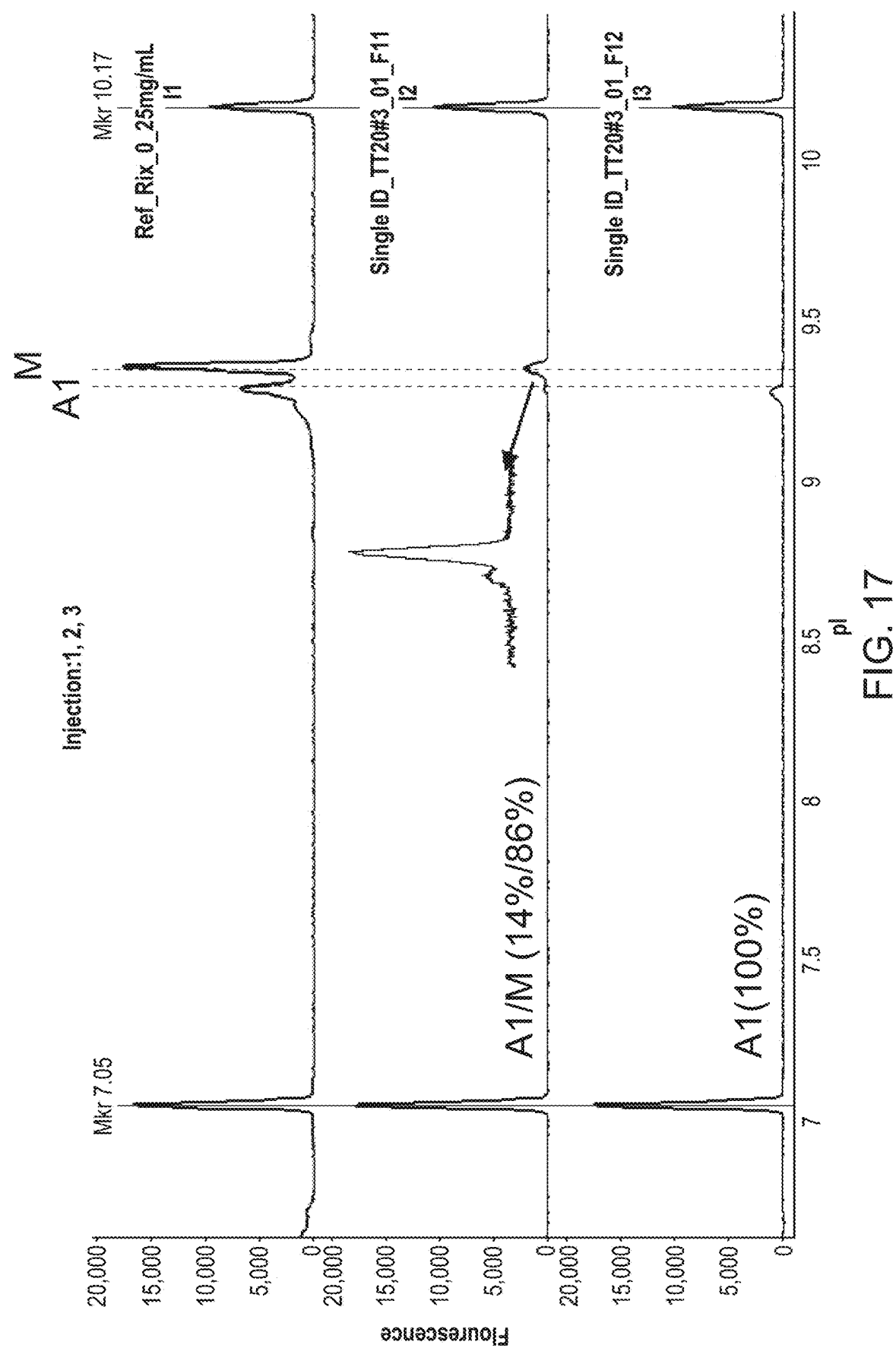
FIG. 17 depicts experimental data indicating fractions of a sample mixture collected using a fractionation system.
Figure 18:
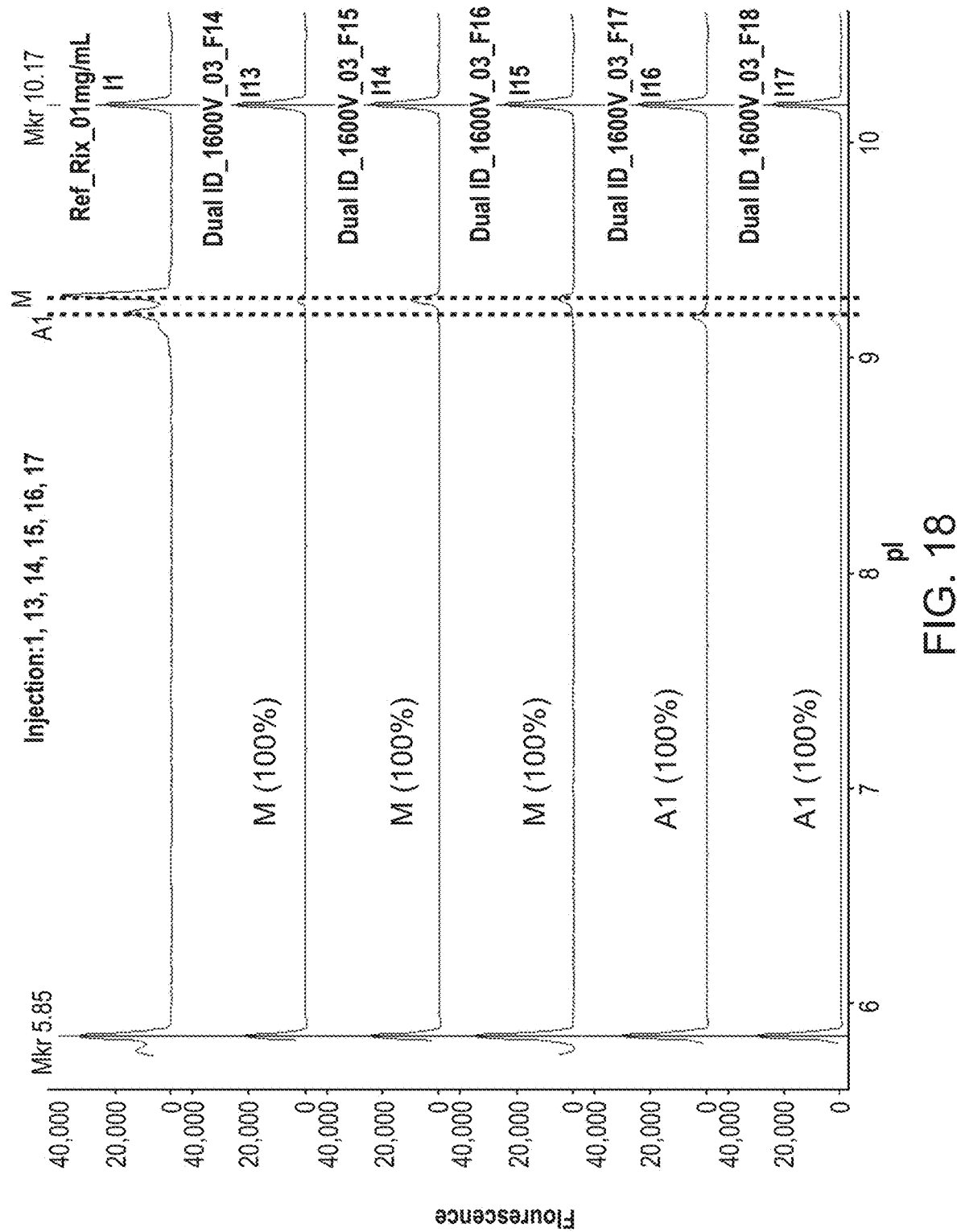
FIG. 18 depicts experimental data indicating fractions of a sample mixture collected using a fractionation system.

FIGS. 17 and 18 show experimental results indicating the benefits of using a cartridge with a capillary having multiple segments with varied inner diameter, FIG. 17 is plot of traces showing an example of separated fractions of CD20-Rituximab collected from using a cartridge having a capillary with a single segment with a single inner diameter (320 um). The elution time for fraction collection was 50 s. The top most trace represents the unfractionated CD20 which was used as reference to identify and match peaks. The CD20 trace shows two major charge variants, namely A1 and M, respectively. As shown in FIG. 17, charge variant M was collected in fraction F11 (middle trace) and charge variant A1 was collected over two adjacent fractions F11 (middle trace) and fraction F12 (bottom traces). As shown, fraction F11 contains a mixture of A1 and M and fraction F12 contains pure A1.

FIG. 18 is a plot of traces showing an example of separated fractions of CD20-Rituximab collected from using a cartridge having a capillary with multiple segments. The capillary used included two segments with inner diameters of 300 μm and 150 μm connected by a transition segment. The elution time for fraction collection associated with the traces in FIG. 18 was 50 s. The top-most trace in FIG. 18 represents the unfractionated CD20 which was used as reference to identify and match peaks. As in the top-most trace in FIG. 17, the CD20 trace shows two major charge variants, A1 and M. In contrast to the traces representing the fractions shown in FIG. 17, however, when using the multi-segment capillary, charge variant M was collected over three adjacent fractions, F14-F16, shown in the second, third, and fourth trace from the top, respectively. Charge variant A1 was collected over two adjacent fractions F17 and F18, shown in the fifth and sixth traces from the top in FIG. 18. Each fraction collected using the cartridge with capillary with multiple segments contained only pure M or only pure A1. Thus, collection of fractions with greater purity of analytes or charge variants was achieved using the cartridge with capillary with multiple segments.

Thus, embodiments disclosed herein present methods and systems to separate and collect charge variants from a sample using an icIEF process. The concentration of a collected fraction can be adjusted by adjusting a starting concentration of a sample, the inner diameter(s) of the capillary used, and/or the volume of the chemical mobilizer in the fraction collection wells. Chemicals with different negative ions, for example, acetate and phosphate, can be used as chemical mobilizers. The speed of mobilization can be adjusted by the concentrations of the mobilizer, the applied voltage, the composition of the separation buffer (mixture of sample, ampholyte, and additives), and the ID of the capillary tube. The collection time for a well can be adjusted along with the speed of mobilization to allow a single charge variant or multiple charge variants to be collected into a single well.

Formulations of the assay buffers (e.g., "master mix") (that may be used with other standard separation systems) can be used with the cartridges disclosed herein to be used for fractionation. Utilizing similar master mixes can minimize assay development time needed to transfer an existing assay from the standard icIEF Maurice cartridge to the sample fractionation cartridges and methods described herein (or vice versa).

The methods, apparatus, and systems disclosed herein enable high-performance sample fractionation in the easy-to-use Maurice icIEF cartridge format. In contrast to hyphenated methods such as cIEF-MS, a variety of downstream analyses can be performed on the fractions obtained from the fractionation methods disclosed here. For example, the collected fraction can be used directly without further sample preparation; or the collected fraction can be concentrated, diluted, or buffer exchanged before the downstream analysis; or the same fraction from multiple fractionation runs can be pooled together if a larger quantity is needed for certain downstream analysis; or the collected fraction can be cleaned-up to remove any components incompatible with certain downstream analysis.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. A method, comprising:
   introducing, at a first time, a sample containing a plurality of analytes in a conductive medium into a capillary, ionically coupling a first end of the capillary to a first running buffer having a first pH;
   ionically coupling a second end of the capillary to a second running buffer having a second pH, such that a pH gradient forms along the capillary;
   separating, at a second time after the first time, at least a subset of the plurality analytes according to their isoelectric points by applying a voltage across the first running buffer and the second running buffer when the first end of the capillary is ionically coupled to the first running buffer and the second end of the capillary is ionically coupled to the second running buffer;
   placing the second end of the capillary into a well including a chemical mobilizer at a third time after the first time to elute an analyte from the plurality of analytes from the capillary and into the well; and
   applying a second voltage across the first running buffer and the chemical mobilizer at the third time and when the first end of the capillary is ionically coupled to the first running buffer and the second end of the capillary is disposed in the well, the second voltage and the chemical mobilizer collectively causing the analyte to be eluted.

2. The method of claim 1, wherein a duration for which the second voltage is applied is based on a speed of mobilization associated with the analyte.

3. The method of claim 1, further comprising:
   increasing, at a fourth time after the third time, a pressure at the first end of the capillary such that the pressure induces hydrodynamic flow in the capillary, eluting the analyte.

4. The method of claim 3, wherein an amount of the pressure applied at the first end of the capillary is based on a speed of mobilization associated with the analyte.

5. The method of claim 1, wherein:
   a metal tip is disposed at the second end of the capillary to provide electrical connectivity between the second end of the capillary and the first end of the capillary, such that the first voltage and the second voltage are applied via the metal tip.

6. The method of claim 1, wherein a metal tip is disposed at the second end of the capillary, the method further comprising:
   electrically coupling a first electrode to the first running buffer; and
   electrically coupling a second electrode to the metal tip such that the first electrode, the second electrode, and a portion of the sample drawn into the capillary define a portion of an electrical circuit.

7. The method of claim 1, wherein:
   a porous membrane is disposed on the first end of the capillary, such that the porous membrane allows ion exchange between the first running buffer and the second running buffer when the second end of the capillary is disposed a running buffer reservoir containing the second running buffer while inhibiting hydrodynamic flow between the running buffer reservoir and the capillary.

8. The method of claim 1, wherein the capillary has an inner diameter of 320-530 µm.

9. The method of claim 1, wherein the capillary has an inner diameter of 200-500 µm.

10. The method of claim 1, wherein the capillary has a length of 60-120 mm.

11. The method of claim 1, wherein the capillary has a length of 20-30 cm.

12. The method of claim 1, wherein:
    a porous membrane configured to allow ion exchange between the first running buffer and the second running buffer and having a molecular weight cut-off from 10 kDa to 500 kDa is disposed on the first end of the capillary.

13. The method of claim 1, wherein:
    a porous membrane tubing configured to balance ion-exchange between the first running buffer and at least one of the second running buffer or the chemical mobilizer and having a molecular weight cut-off from 10 kDa to 500 kDa is disposed on the first end of the capillary.

14. The method of claim 1, wherein:
    a porous membrane tubing configured to balance ion-exchange between the first running buffer and at least one of the second running buffer or the chemical mobilizer and having a diameter of the porous membrane tubing that is matched with an inner and/or an outer diameter of the capillary is disposed on the first end of the capillary.

15. The method of claim 1, wherein there is no porous membrane tubing disposed on the second end of the capillary.

16. The method of claim 1, wherein:
the analyte is a first analyte from the plurality of analytes; and
separating at least the subset of the plurality of analytes causes the first analyte to be focused at a first distance from the second end of the capillary and a second analyte from the plurality of analytes to be focused at a second distance from the second end of the capillary, the second distance being greater than the first distance, the method further comprising:
determining a magnitude of the second voltage or a duration of application of the second voltage based on a measure of separation between the first distance and the second distance such that applying the second voltage over the duration causes the first analyte to be eluted into the well from the first distance, without the second analyte being eluted into the well.

17. The method of claim 16, wherein the magnitude of the second voltage the chemical mobilizer the first analyte migrates towards the well at a rate 1 mm/min to 2 mm/min when the second voltage is applied.

18. An apparatus, comprising: The method of claim 1, wherein:
the capillary is from at least one capillary tube that defines a capillary lumen, a first portion of the capillary lumen having a first inner diameter and a first length, and a second portion of the capillary lumen having a second inner diameter and a second length.

19. The method of claim 18, wherein the first inner diameter is 2-3 times that of the second inner diameter.

20. The method of claim 18, wherein the first inner diameter is between 300 and 500 μm.

21. The method of claim 18, wherein the second inner diameter is between 100 and 200 μm.

22. The method of claim 18, wherein the first length is 3-4 times that of the second length.

23. The method of claim 18, wherein the at least one capillary tube that defines the capillary lumen is monolithically formed.

24. The method of claim 18, wherein the at least one capillary tube includes a first capillary tube associated with the first portion of the capillary lumen joined to a second capillary tube associated with a second portion of the capillary lumen.

* * * * *

UNITED STATES PATENT AND TRADEMARK OFFICE
CERTIFICATE OF CORRECTION

PATENT NO. : 11,420,202 B1
APPLICATION NO. : 17/463326
DATED : August 23, 2022
INVENTOR(S) : Cheng Zhou et al.

Page 1 of 1

It is certified that error appears in the above-identified patent and that said Letters Patent is hereby corrected as shown below:

In the Claims

Column 51, Claim 18, Line 22 reads:
18. An apparatus, comprising: The method of claim 1,
Whereas it should read:
18. The method of claim 1, Signed and Sealed this
Fifth Day of August, 2025

Coke Morgan Stewart
*Acting Director of the United States Patent and Trademark Office*